(12) United States Patent
Park et al.

(10) Patent No.: US 11,917,611 B2
(45) Date of Patent: *Feb. 27, 2024

(54) METHOD AND APPARATUS FOR RECEIVING UE TO PERFORM POWER SAVING OPERATION BASED ON PSFCH IN NR V2X

(71) Applicant: LG ELECTRONICS INC., Seoul (KR)

(72) Inventors: Giwon Park, Seoul (KR); Seungmin Lee, Seoul (KR); Seoyoung Back, Seoul (KR); Hanbyul Seo, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,619

(22) Filed: Apr. 6, 2023

(65) Prior Publication Data

US 2023/0254843 A1 Aug. 10, 2023

Related U.S. Application Data

(63) Continuation of application No. 17/702,246, filed on Mar. 23, 2022, now Pat. No. 11,627,591.

(30) Foreign Application Priority Data

Mar. 24, 2021 (KR) .................. 10-2021-0038230
Dec. 21, 2021 (KR) .................. 10-2021-0183276

(51) Int. Cl.
*H04W 72/1263* (2023.01)
*H04L 1/1812* (2023.01)
(Continued)

(52) U.S. Cl.
CPC ....... *H04W 72/1263* (2013.01); *H04L 1/1812* (2013.01); *H04W 72/20* (2023.01); *H04W 76/28* (2018.02)

(58) Field of Classification Search
CPC ............. H04W 72/1263; H04W 76/28; H04W 72/1278; H04L 1/1812
See application file for complete search history.

(56) References Cited

U.S. PATENT DOCUMENTS

2019/0053322 A1* 2/2019 Wu .................. H04L 1/188
2020/0305139 A1* 9/2020 Xu .................. H04W 72/0406
(Continued)

FOREIGN PATENT DOCUMENTS

WO WO-2021119474 A1 * 6/2021 ........ H04W 72/0406

*Primary Examiner* — Parth Patel
(74) *Attorney, Agent, or Firm* — LEE, HONG, DEGERMAN, KANG & WAIMEY

(57) ABSTRACT

A method of operating a first apparatus 100 in a wireless communication system is proposed. The method may comprise: obtaining an SL DRX configuration including information related to an SL DRX HARQ RTT timer; receiving SCI for scheduling a PSSCH from a second apparatus through a PSCCH based on an active time of the SL DRX configuration; receiving a MAC PDU through the PSSCH from the second apparatus; and starting the SL DRX HARQ RTT timer, based on that a PSFCH resource is configured in an SL grant related to the SCI and that a HARQ feedback related to the MAC PDU is disabled.

15 Claims, 18 Drawing Sheets

(51) Int. Cl.
*H04W 72/20* (2023.01)
*H04W 76/28* (2018.01)

(56) References Cited

U.S. PATENT DOCUMENTS

| | | | |
|---|---|---|---|
| 2021/0212099 A1* | 7/2021 | Yi | H04W 72/042 |
| 2021/0306948 A1* | 9/2021 | Ding | H04L 1/1812 |
| 2022/0015186 A1* | 1/2022 | Jeong | H04L 1/1816 |
| 2022/0022279 A1* | 1/2022 | Kim | H04W 76/14 |
| 2022/0030661 A1* | 1/2022 | Jeong | H04W 72/0406 |
| 2022/0053340 A1* | 2/2022 | Ryu | H04W 24/08 |
| 2022/0095326 A1* | 3/2022 | Li | H04W 52/0229 |
| 2022/0109970 A1* | 4/2022 | Jeong | H04W 72/02 |
| 2022/0191851 A1* | 6/2022 | Park | H04W 76/28 |
| 2022/0225469 A1* | 7/2022 | Lee | H04L 5/0055 |

* cited by examiner

METHOD AND APPARATUS FOR RECEIVING UE TO PERFORM POWER SAVING OPERATION BASED ON PSFCH IN NR V2X

CROSS-REFERENCE TO RELATED APPLICATIONS

This application is a continuation of U.S. patent application Ser. No. 17/702,246, filed on Mar. 23, 2022, which claims the benefit of earlier filing date and right of priority to Korean Patent Application Nos. 10-2021-0038230, filed on Mar. 24, 2021, and 10-2021-0183276, filed on Dec. 21, 2021, the contents of which are all hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Solutions

According to an embodiment of the present disclosure, a method for a first apparatus to perform wireless communication may be proposed. For example, the method may comprise: obtaining a sidelink (SL) discontinuous reception (DRX) configuration including information related to an SL DRX hybrid automatic repeat request (HARQ) round trip time (RTT) timer; receiving sidelink control information (SCI) for scheduling of a physical sidelink shared channel (PSSCH) through a physical sidelink control channel (PSCCH) from a second apparatus, based on an active time of the SL DRX configuration; receiving a medium access control (MAC) protocol data unit (PDU) of the PSSCH from the second apparatus, based on the active time; and starting the SL DRX HARQ RTT timer, based on that a physical sidelink feedback channel (PSFCH) resource is configured to an SL grant related to the SCI and a HARQ feedback related to the MAC PDU is disabled, wherein the SL DRX HARQ RTT timer is started in a slot following an end of the transmission through the PSSCH, based on that the SCI includes information related to a retransmission resource of the MAC PDU, and wherein the SL DRX HARQ RTT timer is started in a slot following an end of the PSFCH resource, based on that the SCI doesn't include information related to a retransmission resource of the MAC PDU.

According to an embodiment of the present disclosure, a first apparatus for performing wireless communication may be proposed. For example, the first apparatus may comprise: one or more memories storing instructions; one or more transceivers; and one or more processors connected to the one or more memories and the one or more transceivers. For example, the one or more processors may execute the instructions to: obtain a sidelink (SL) discontinuous reception (DRX) configuration including information related to an SL DRX hybrid automatic repeat request (HARQ) round trip time (RTT) timer; receive sidelink control information (SCI) for scheduling of a physical sidelink shared channel (PSSCH) through a physical sidelink control channel (PSCCH) from a second apparatus, based on an active time of the SL DRX configuration; receive a medium access control (MAC) protocol data unit (PDU) of the PSSCH from the second apparatus, based on the active time; and start the SL DRX HARQ RTT timer, based on that a physical sidelink feedback channel (PSFCH) resource is configured to an SL grant related to the SCI and a HARQ feedback related to the MAC PDU is disabled, wherein the SL DRX HARQ RTT timer is started in a slot following an end of the transmission through the PSSCH, based on that the SCI includes information related to a retransmission resource of the MAC PDU, and wherein the SL DRX HARQ RTT timer is started in a slot following an end of the PSFCH resource, based on that the SCI doesn't include information related to a retransmission resource of the MAC PDU.

According to an embodiment of the present disclosure, an apparatus configured to control a first user equipment (UE) may be proposed. For example, the apparatus may comprise: one or more processors; and one or more memories operably connectable to the one or more processors and storing instructions. For example, the one or more processors may execute the instructions to: obtain a sidelink (SL) discontinuous reception (DRX) configuration including information related to an SL DRX hybrid automatic repeat request (HARQ) round trip time (RTT) timer; receive sidelink control information (SCI) for scheduling of a physical sidelink shared channel (PSSCH) through a physical sidelink control channel (PSCCH) from a second UE, based on an active time of the SL DRX configuration; receive a medium access control (MAC) protocol data unit (PDU) of the PSSCH from the second UE, based on the active time; and start the SL DRX HARQ RTT timer, based on that a physical sidelink feedback channel (PSFCH) resource is configured to an SL grant related to the SCI and a HARQ feedback related to the MAC PDU is disabled, wherein the SL DRX HARQ RTT timer is started in a slot following an end of the transmission through the PSSCH, based on that the SCI includes information related to a retransmission resource of the MAC PDU, and wherein the SL DRX HARQ RTT timer is started in a slot following an end of the PSFCH resource, based on that the SCI doesn't include information related to a retransmission resource of the MAC PDU.

According to an embodiment of the present disclosure, a non-transitory computer-readable storage medium storing instructions may be proposed. For example, the instructions, when executed, may cause a first apparatus to: obtain a sidelink (SL) discontinuous reception (DRX) configuration including information related to an SL DRX hybrid automatic repeat request (HARQ) round trip time (RTT) timer; receive sidelink control information (SCI) for scheduling of a physical sidelink shared channel (PSSCH) through a physical sidelink control channel (PSCCH) from a second apparatus, based on an active time of the SL DRX configuration; receive a medium access control (MAC) protocol data unit (PDU) of the PSSCH from the second apparatus, based on the active time; and start the SL DRX HARQ RTT timer, based on that a physical sidelink feedback channel (PSFCH) resource is configured to an SL grant related to the SCI and a HARQ feedback related to the MAC PDU is disabled, wherein the SL DRX HARQ RTT timer is started in a slot following an end of the transmission through the PSSCH, based on that the SCI includes information related to a retransmission resource of the MAC PDU, and wherein the SL DRX HARQ RTT timer is started in a slot following an end of the PSFCH resource, based on that the SCI doesn't include information related to a retransmission resource of the MAC PDU.

According to an embodiment of the present disclosure, a method for a first apparatus to perform wireless communication may be proposed. For example, the method may comprise: transmitting sidelink control information (SCI) for scheduling of a physical sidelink shared channel (PSSCH) through a physical sidelink control channel (PSCCH) to a first apparatus, based on an active time of a sidelink (SL) discontinuous reception (DRX) configuration related to an SL DRX operation performed by the first apparatus; transmitting a medium access control (MAC) protocol data unit (PDU) of the PSSCH to the first apparatus, based on the active time; receiving negative acknowledgement (NACK) information related to the MAC PDU, based on a physical sidelink feedback channel (PSFCH) resource; and performing a retransmission of the MAC PDU, based on the NACK information and the active time, wherein the SL DRX configuration may include information related to an SL DRX hybrid automatic repeat request (HARQ) round trip time (RTT) timer, the SL DRX HARQ RTT timer may be started by the first apparatus based on that a physical sidelink feedback channel (PSFCH) resource is configured in an SL grant related to the SCI and that a HARQ feedback related to the MAC PDU is disabled, based on that the SCI includes information related to a retransmission resource of the MAC PDU, the SL DRX HARQ RTT timer may be started in a slot next to an end of transmission through the PSSCH, and based on that the SCI does not include information related to the retransmission resource of the MAC PDU, the SL DRX HARQ RTT timer may be started in a slot next to the end of the PSFCH resource.

According to an embodiment of the present disclosure, a second apparatus for performing wireless communication may be proposed. For example, the second apparatus may comprise: one or more memories storing instructions; one or more transceivers; and one or more processors connected to the one or more memories and the one or more transceivers. For example, the one or more processors may execute the instructions to: transmit sidelink control information (SCI) for scheduling of a physical sidelink shared channel (PSSCH) through a physical sidelink control channel (PSCCH) to a first apparatus, based on an active time of a sidelink (SL) discontinuous reception (DRX) configuration related to an SL DRX operation performed by the first apparatus; transmit a medium access control (MAC) protocol data unit (PDU) of the PSSCH to the first apparatus, based on the active time; receive negative acknowledgement (NACK) information related to the MAC PDU, based on a physical sidelink feedback channel (PSFCH) resource; and perform a retransmission of the MAC PDU, based on the NACK information and the active time, wherein the SL DRX configuration may include information related to an SL DRX hybrid automatic repeat request (HARQ) round trip time (RTT) timer, the SL DRX HARQ RTT timer may be started by the first apparatus based on that a physical sidelink feedback channel (PSFCH) resource is configured in an SL grant related to the SCI and that a HARQ feedback related to the MAC PDU is disabled, based on that the SCI includes information related to a retransmission resource of the MAC PDU, the SL DRX HARQ RTT timer may be started in a slot next to an end of transmission through the PSSCH, and based on that the SCI does not include information related to the retransmission resource of the MAC PDU, the SL DRX HARQ RTT timer may be started in a slot next to the end of the PSFCH resource.

Effects of the Disclosure

The user equipment (UE) may efficiently perform retransmission based on hybrid automatic repeat request (HARQ) feedback.

DESCRIPTION OF EXEMPLARY EMBODIMENTS

Figure 1:
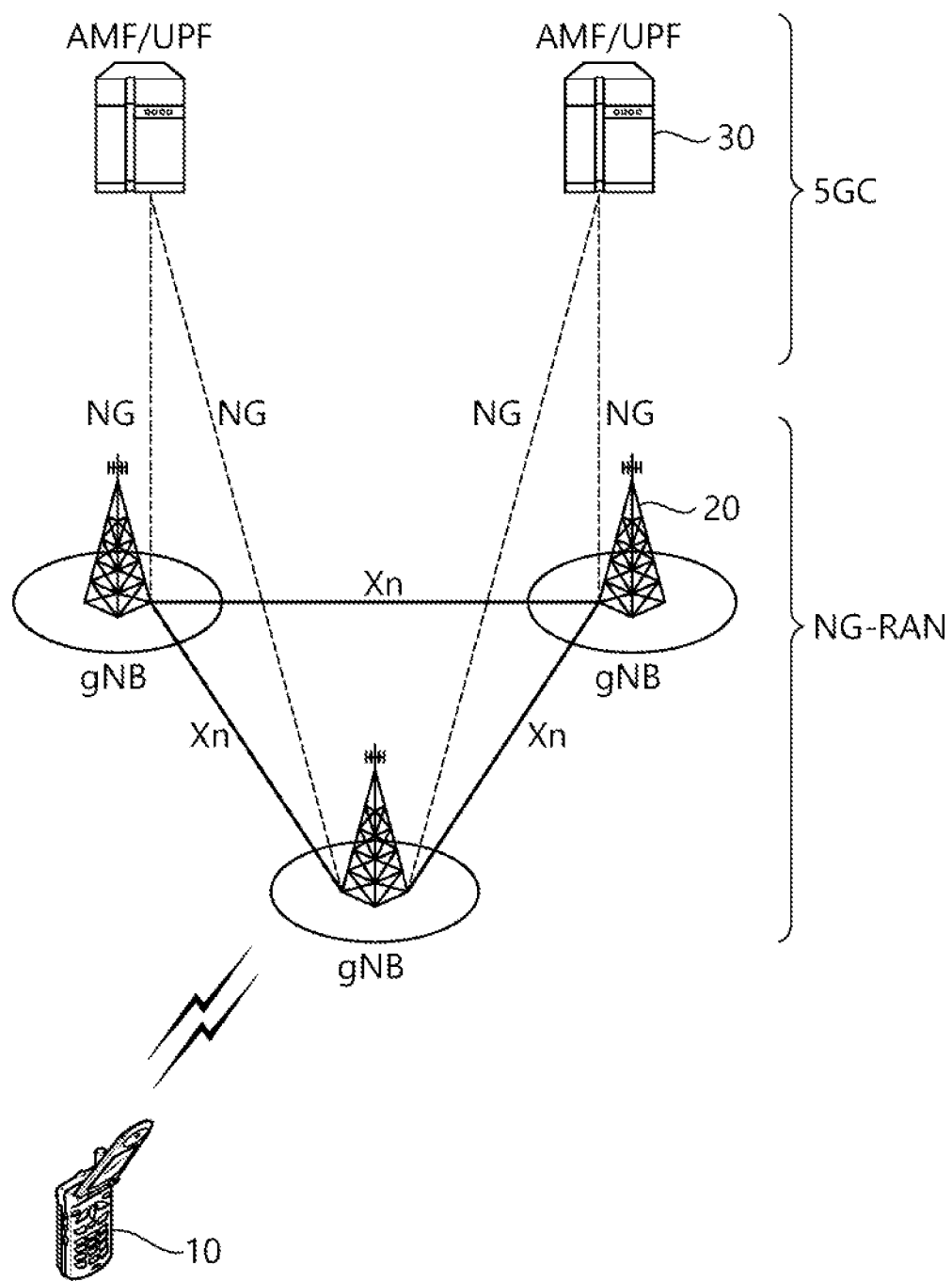
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, a wireless communication standard document published before the present specification is filed may be referred to.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
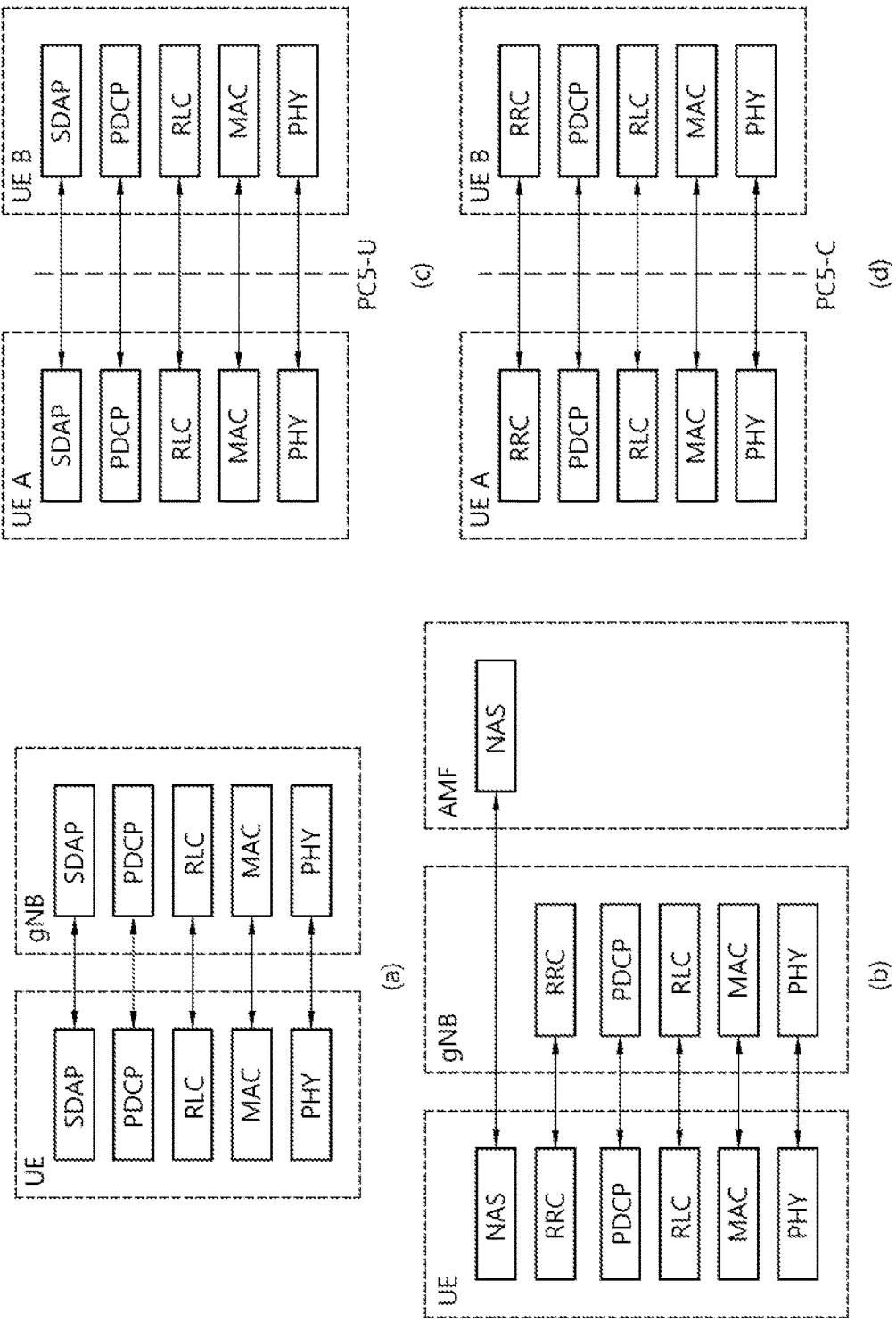
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
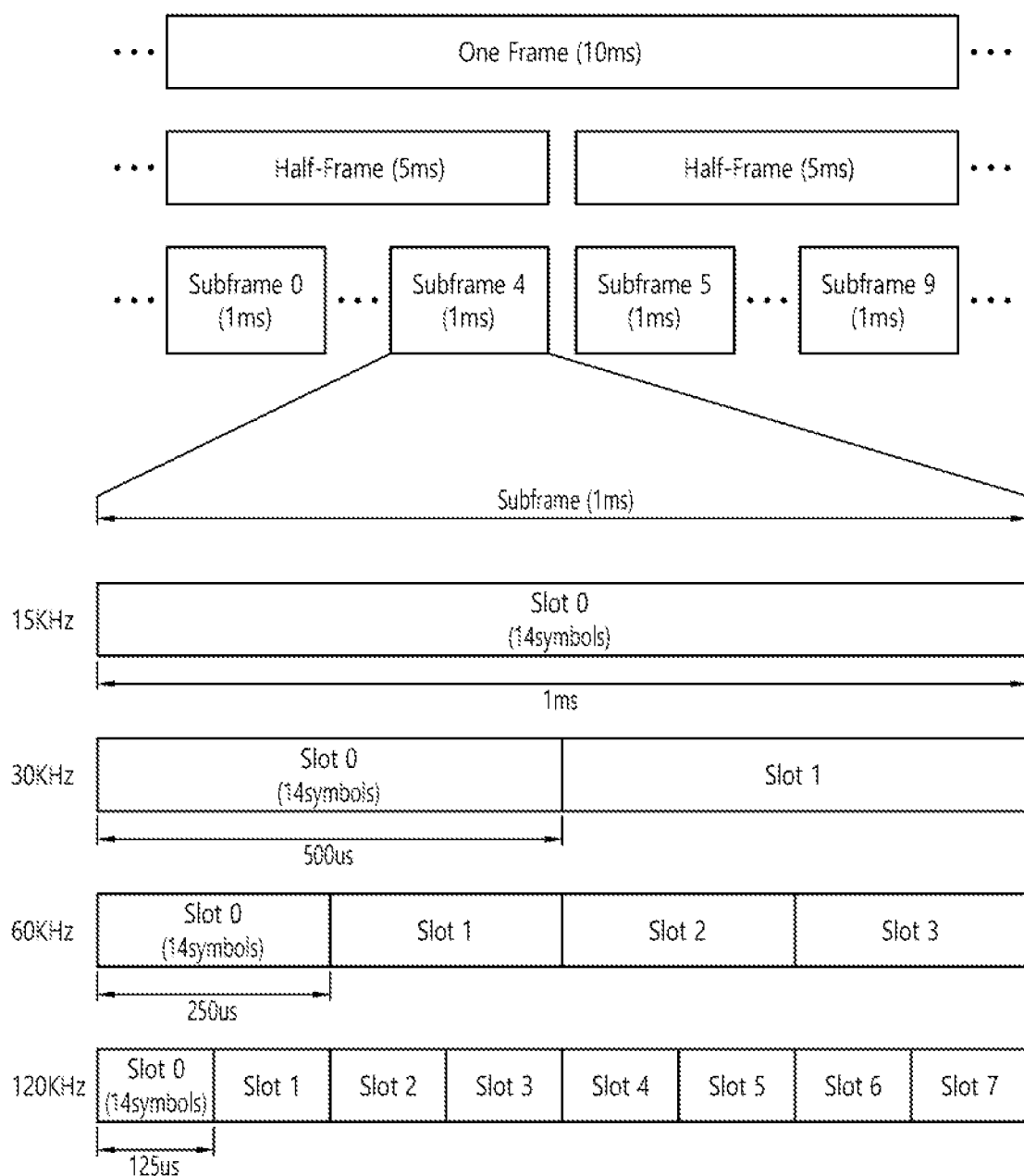
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N_{symb}^{slot}$ | $N_{slot}^{frame, u}$ | $N_{slot}^{subframe, u}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHZ | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 KHz |
| FR2 | 24250 MHz-52600 MHZ | 60, 120, 240 KHz |

Figure 4:
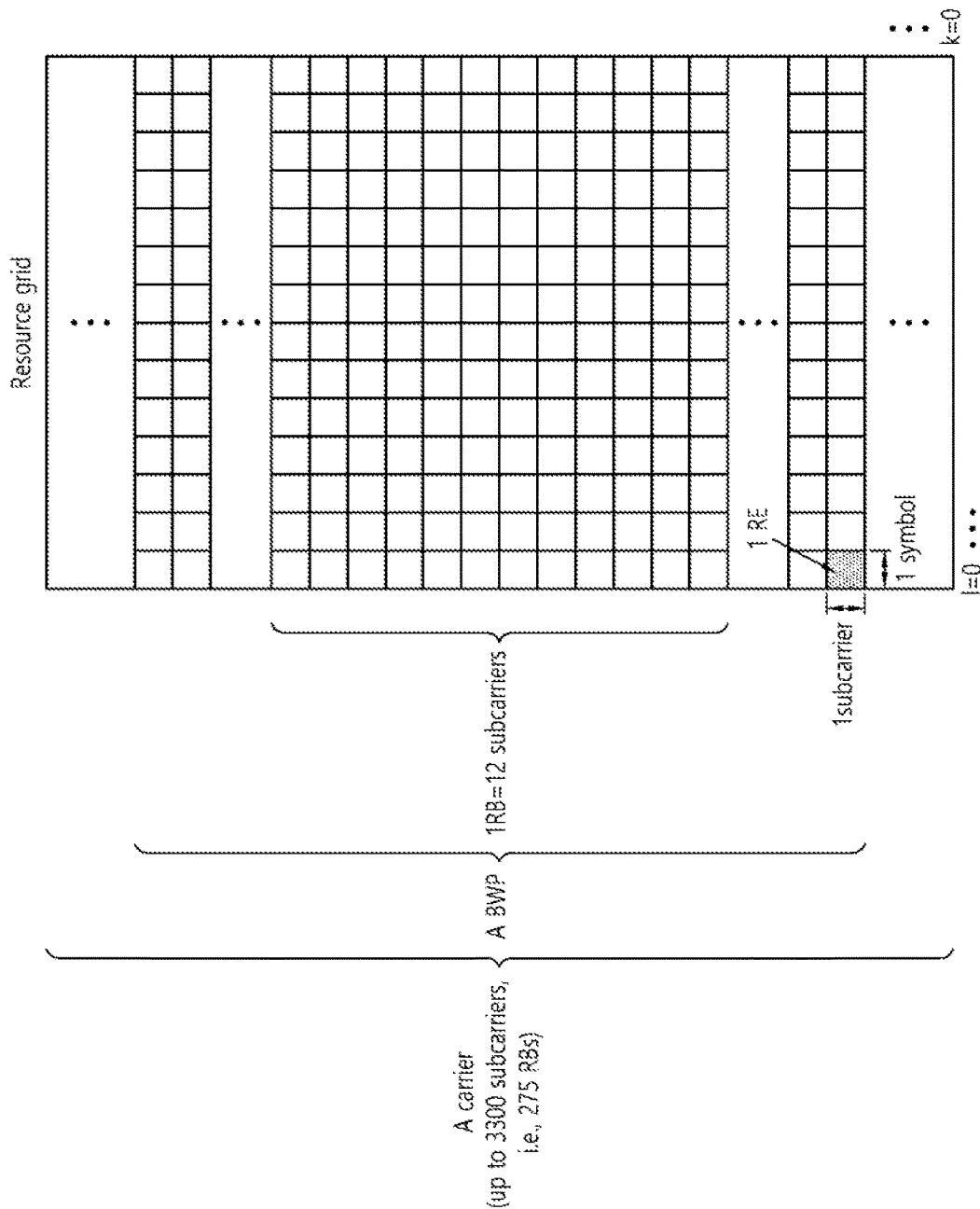
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols. A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
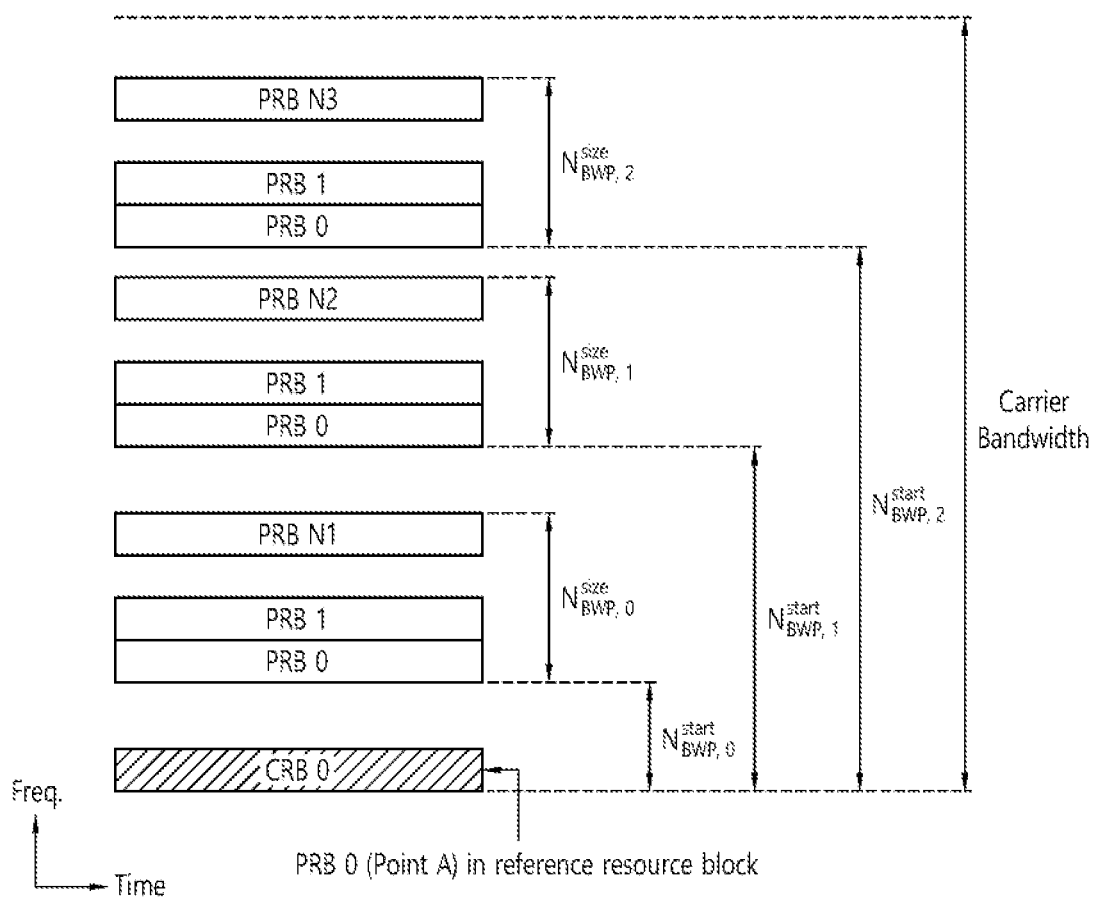
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
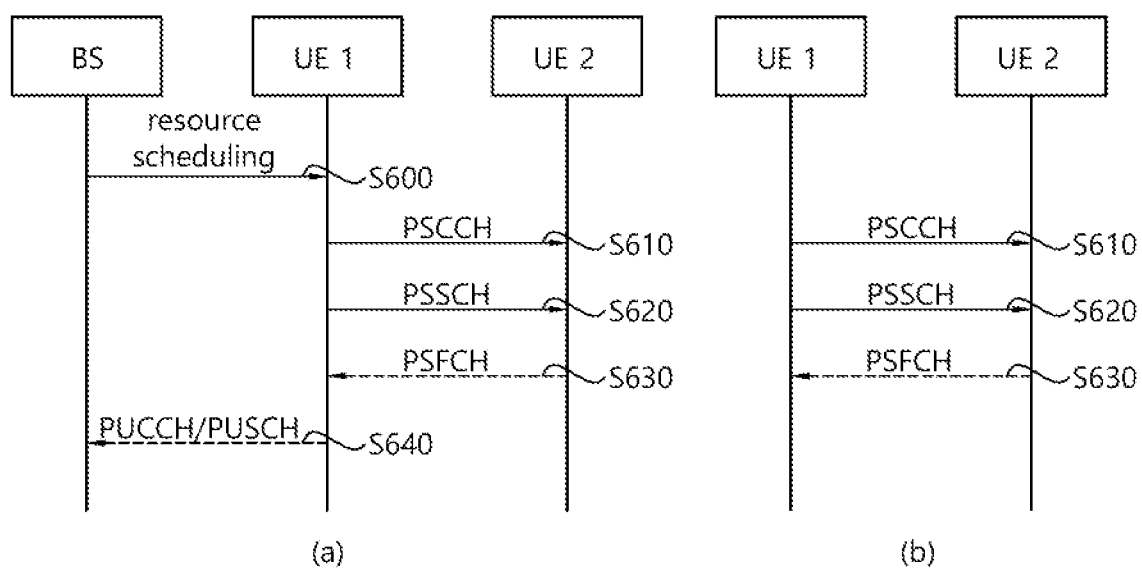
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling $(\log_2(N^{SL}_{subChannel}(N^{SL}_{subChannel}+1)/2))$ bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling $(\log_2 N_{rsv\_period})$ bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling $(\log_2 N_{pattern})$ bits, where $N_{pattern}$ is the number of DMRS patterns configured by higher layer parameter sl-PSSCH-DMRS-TimePatternList $2^{nd}$-stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
| --- | --- |
| 00 | SCI format 2-A |
| 01 | SCI format 2-B |
| 10 | Reserved |
| 11 | Reserved |

TABLE 6

| Value of the Number of DMRS port field | Antenna ports |
| --- | --- |
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits
New data indicator—1 bit
Redundancy version—2 bits
Source ID—8 bits
Destination ID—16 bits
HARQ feedback enabled/disabled indicator—1 bit
Cast type indicator—2 bits as defined in Table 7
CSI request—1 bit

TABLE 7

| Value of Cast type indicator | Cast type |
| --- | --- |
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits
New data indicator—1 bit
Redundancy version—2 bits
Source ID—8 bits
Destination ID—16 bits
HARQ feedback enabled/disabled indicator—1 bit
Zone ID—12 bits
Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Hereinafter, a UE procedure for reporting HARQ-ACK in the sidelink will be described.

A UE can be indicated by an SCI format scheduling a PSSCH reception, in one or more sub-channels from a number of $N^{PSSCH}_{subch}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool are disabled. A UE expects that a slot $t'^{SL}_k$ ($0 \leq k < T'_{max}$) has a PSFCH transmission occasion resource if k mod $N^{PSFCH}_{PSSCH} = 0$, where $t'^{SL}_k$ is a slot that belongs to the resource pool, $T'_{max}$ is a number of slots that belong to the resource pool within 10240 msec, and $N^{PSFCH}_{PSSCH}$ is provided by sl-PSFCH-Period-r16. A UE may be indicated by higher layers to not transmit a PSFCH in response to a PSSCH reception. If a UE receives a PSSCH in a resource pool and the HARQ feedback enabled/disabled indicator field in an associated SCI format 2-A or a SCI format 2-B has value 1, the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

A UE is provided by sl-PSFCH-RB-Set-r16 a set of $M^{PSFCH}_{PRB,set}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N^{PSFCH}_{PSSCH}$, the UE allocates the $[(i-j \cdot N^{PSFCH}_{PSSCH}) \cdot M^{PSFCH}_{subch,slot}, (i+1+j \cdot N^{PSFCH}_{PSSCH}) \cdot M^{PSFCH}_{subch,slot} - 1]$ PRBs from the $M^{PSFCH}_{PRB,set}$ PRBs to slot i among the PSSCH slots associated with the PSFCH slot and subchannel j, where $M^{PSFCH}_{subch,slot} = M^{PSFCH}_{PRB,set} / (N_{subch} \cdot N^{PSFCH}_{PSSCH})$, $0 \leq i < N^{PSFCH}_{PSSCH}$, $0 \leq j < N_{subch}$, and the allocation starts in an ascending order of i and continues in an ascending order of j. The UE expects that $M^{PSFCH}_{PRB,set}$ is a multiple of $N_{subch} \cdot N^{PSFCH}_{PSSCH}$.

A UE determines a number of PSFCH resources available for multiplexing HARQ-ACK information in a PSFCH transmission as $R^{PSFCH}_{PRB,CS} = N^{PSFCH}_{type} \cdot M^{PSFCH}_{subch,slot} \cdot N^{PSFCH}_{CS}$ where $N^{PSFCH}_{CS}$ is a number of cyclic shift pairs for the resource pool and, based on an indication by higher layers, $N^{PSFCH}_{type} = 1$ and the $M^{PSFCH}_{subch,slot}$ PRBs are associated with the starting subchannel of the corresponding PSSCH $N^{PSFCH}_{type} = N^{PSSCH}_{subch}$ and the $N^{PSSCH}_{subch} \cdot M^{PSFCH}_{subch,slot}$ PRBs are associated with one or more sub-channels from the $N^{PSSCH}_{subch}$ sub-channels of the corresponding PSSCH The PSFCH resources are first indexed according to an ascending order of the PRB index, from the $N^{PSFCH}_{type} \cdot M^{PSFCH}_{subch,slot}$ PRBs, and then according to an ascending order of the cyclic shift pair index from the $N^{PSFCH}_{CS}$ cyclic shift pairs.

A UE determines an index of a PSFCH resource for a PSFCH transmission in response to a PSSCH reception as $(P_{ID} + M_{ID})$ mod $R^{PSFCH}_{PRB,CS}$ where $P_{ID}$ is a physical layer source ID provided by SCI format 2-A or 2-B scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE determines a $m_0$ value, for computing a value of cyclic shift α, from a cyclic shift pair index corresponding to a PSFCH resource index and from $N^{PSFCH}_{CS}$ using Table 8.

TABLE 8

| $N^{PSFCH}_{CS}$ | $m_0$ | | | | | |
|---|---|---|---|---|---|---|
| | cyclic shift pair index 0 | cyclic shift pair index 1 | cyclic shift pair index 2 | cyclic shift pair index 3 | cyclic shift pair index 4 | cyclic shift pair index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift α, as in Table 9 if the UE detects a SCI format 2-A with Cast type indicator field value of "01" or "10", or as in Table 10 if the UE detects a SCI format 2-B or a SCI format 2-A with Cast type indicator field value of "11". The UE applies one cyclic shift from a cyclic shift pair to a sequence used for the PSFCH transmission.

TABLE 9

| HARQ-ACK Value | 0 (NACK) | 1 (ACK) |
|---|---|---|
| Sequence cyclic shift | 0 | 6 |

TABLE 10

| HARQ-ACK Value | 0 (NACK) | 1 (ACK) |
|---|---|---|
| Sequence cyclic shift | 0 | N/A |

Figure 7:
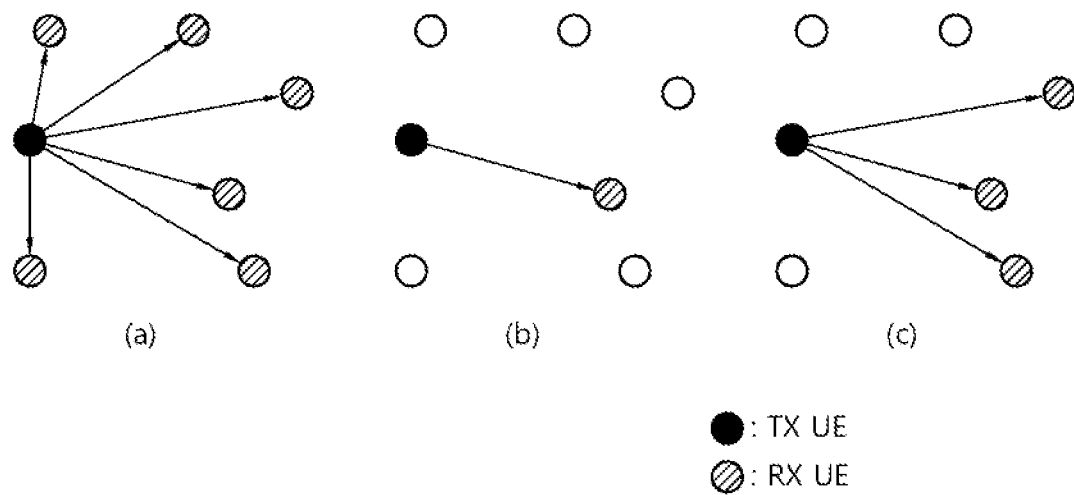
FIG. 7 shows three cast types, based on an embodiment of the present disclosure.

FIG. 7 shows three cast types, in accordance with an embodiment of the present disclosure. The embodiment of FIG. 7 may be combined with various embodiments of the present disclosure.

Specifically, FIG. 7(a) shows broadcast-type SL communication, FIG. 7(b) shows unicast type-SL communication, and FIG. 7(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like. In this specification, the "configure or define" wording may be interpreted as being (pre)configured (via pre-defined signaling (e.g., SIB, MAC signaling, RRC signaling)) from a base station or a network. For example, "A may be configured" may include "that a base station or network (pre-)configures/defines or informs A for a UE". Alternatively, the wording "configure or define" may be interpreted as being configured or defined in advance by a system. For example, "A may be configured" may include "A is configured/defined in advance by a system".

Referring to the standard document, some procedures and technical specifications related to the present disclosure are as follows.

TABLE 11

3GPP TS 38.321 V16.2.1

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

NOTE 1: If Sidelink resource allocation mode 1 is configured by RRC, a DRX functionality is not configured.

RRC controls DRX operation by configuring the following parameters:
- drx-onDurationTimer: the duration at the beginning of a DRX cycle;
- drx-SlotOffset: the delay before starting the drx-onDurationTimer;
- drx-InactivityTimer: the duration after the PDCCH occasion in which a PDCCH indicates a new UL or DL transmission for the MAC entity;
- drx-RetransmissionTimerDL (per DL HARQ process except for the broadcast process): the maximum duration until a DL retransmission is received;
- drx-RetransmissionTimerUL (per UL HARQ process): the maximum duration until a grant for UL retransmission is received;
- drx-LongCycleStartOffset: the Long DRX cycle and drx-StartOffset which defines the subframe where the Long and Short DRX cycle starts;
- drx-ShortCycle (optional): the Short DRX cycle;
- drx-ShortCycleTimer (optional): the duration the UE shall follow the Short DRX cycle;
- drx-HARQ-RTT-TimerDL (per DL HARQ process except for the broadcast process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity;
- ps-Wakeup (optional): the configuration to start associated drx-onDurationTimer in case DCP is monitored but not detected;
- ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;
- ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

TABLE 12

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

When a DRX cycle is configured, the Active Time for Serving Cells in a DRX group includes the time while:
- drx-onDurationTimer or drx-InactivityTimer configured for the DRX group is running; or
- drx-RetransmissionTimerDL or drx-RetransmissionTimerUL is running on any Serving Cell in the DRX group; or
- ra-ContentionResolutionTimer (as described in clause 5.1.5) or msgB-ResponseWindow (as described in clause 5.1.4a) is running; or
- a Scheduling Request is sent on PUCCH and is pending (as described in clause 5.4.4); or
- a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:

1> if a MAC PDU is received in a configured downlink assignment:
  2> start the drx-HARQ-RTT-TimerDL for the corresponding HARQ process in the first symbol after the end of the corresponding transmission carrying the DL HARQ feedback;
  2> stop the drx-RetransmissionTimerDL for the corresponding HARQ process.

1> if a MAC PDU is transmitted in a configured uplink grant and LBT failure indication is not received from lower layers:
  2> start the drx-HARQ-RTT-TimerUL for the corresponding HARQ process in the first symbol after the end of the first repetition of the corresponding PUSCH transmission;
  2> stop the drx-RetransmissionTimerUL for the corresponding HARQ process.

1> if a drx-HARQ-RTT-TimerDL expires:
  2> if the data of the corresponding HARQ process was not successfully decoded:
    3> start the drx-RetransmissionTimerDL for the corresponding HARQ process in the first symbol after the expiry of drx-HARQ-RTT-TimerDL.

1> if a drx-HARQ-RTT-TimerUL expires:
  2> start the drx-RetransmissionTimerUL for the corresponding HARQ process in the first symbol after the expiry of drx-HARQ-RTT-TimerUL.

1> if a DRX Command MAC CE or a Long DRX Command MAC CE is received:
  2> stop drx-onDurationTimer for each DRX group;
  2> stop drx-InactivityTimer for each DRX group.

TABLE 12-continued

1> if drx-InactivityTimer for a DRX group expires:
  2> if the Short DRX cycle is configured:
    3> start or restart drx-ShortCycleTimer for this DRX group in the first symbol after the expiry of drx-InactivityTimer;
    3> use the Short DRX cycle for this DRX group.
  2> else:
    3> use the Long DRX cycle for this DRX group.
1> if a DRX Command MAC CE is received:
  2> if the Short DRX cycle is configured:
    3> start or restart drx-ShortCycleTimer for each DRX group in the first symbol after the end of DRX Command MAC CE reception;
    3> use the Short DRX cycle for each DRX group.
  2> else:
    3> use the Long DRX cycle for each DRX group.

15

TABLE 13

1> if drx-ShortCycleTimer for a DRX group expires:
  2> use the Long DRX cycle for this DRX group.
1> if a Long DRX Command MAC CE is received:
  2> stop drx-ShortCycleTimer for each DRX group;
  2> use the Long DRX cycle for each DRX group.
1> if the Short DRX cycle is used for a DRX group, and [(SFN × 10) + subframe number] modulo (drx-ShortCycle) = (drx-StartOffset) modulo (drx-ShortCycle):
  2> start drx-onDurationTimer for this DRX group after drx-SlotOffset from the beginning of the subframe.
1> if the Long DRX cycle is used for a DRX group, and [(SFN × 10) + subframe number] modulo (drx-LongCycle) = drx-StartOffset:
  2> if DCP monitoring is configured for the active DL BWP as specified in TS 38.213 [6], clause 10.3:
    3> if DCP indication associated with the current DRX cycle received from lower layer indicated to start drx-onDurationTimer, as specified in TS 38.213 [6]; or
    3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or within BWP switching interruption length, or during a measurement gap, or when the MAC entity monitors for a PDCCH transmission on the search space indicated by recoverySearchSpaceId of the SpCell identified by the C-RNTI while the ra-Response Window is running (as specified in clause 5.1.4); or
    3> if ps-Wakeup is configured with value true and DCP indication associated with the current DRX cycle has not been received from lower layers:
      4> start drx-onDurationTimer after drx-SlotOffset from the beginning of the subframe.
  2> else:
    3> start drx-onDurationTimer for this DRX group after drx-SlotOffset from the beginning of the subframe.
NOTE 2: In case of unaligned SFN across carriers in a cell group, the SFN of the SpCell is used to calculate the DRX duration.
1> if a DRX group is in Active Time:
  2> monitor the PDCCH on the Serving Cells in this DRX group as specified in TS 38.213 [6];
  2> if the PDCCH indicates a DL transmission:
    3> start the drx-HARQ-RTT-TimerDL for the corresponding HARQ process in the first symbol after the end of the corresponding transmission carrying the DL HARQ feedback;
NOTE 3: When HARQ feedback is postponed by PDSCH-to-HARQ_feedback timing indicating a non-numerical k1 value, as specified in TS 38.213 [6], the corresponding transmission opportunity to send the DL HARQ feedback is indicated in a later PDCCH requesting the HARQ-ACK feedback.
    3> stop the drx-RetransmissionTimerDL for the corresponding HARQ process.
    3> if the PDSCH-to-HARQ_feedback timing indicate a non-numerical k1 value as specified in TS 38.213 [6]:
      4> start the drx-RetransmissionTimerDL in the first symbol after the PDSCH transmission for the corresponding HARQ process.
  2> if the PDCCH indicates a UL transmission:
    3> start the drx-HARQ-RTT-TimerUL for the corresponding HARQ process in the first symbol after the end of the first repetition of the corresponding PUSCH transmission;
    3> stop the drx-RetransmissionTimerUL for the corresponding HARQ process.
  2> if the PDCCH indicates a new transmission (DL or UL) on a Serving Cell in this DRX group:
    3> start or restart drx-InactivityTimer for this DRX group in the first symbol after the end of the PDCCH reception.
  2> if a HARQ process receives downlink feedback information and acknowledgement is indicated:
    3> stop the drx-RetransmissionTimerUL for the corresponding HARQ process.

TABLE 14

1> if DCP monitoring is configured for the active DL BWP as specified in TS 38.213 [6], clause 10.3; and
1> if the current symbol n occurs within drx-onDurationTimer duration; and
1> if drx-onDurationTimer associated with the current DRX cycle is not started as specified in this clause:
   2> if the MAC entity would not be in Active Time considering grants/assignments/DRX Command MAC
      CE/Long DRX Command MAC CE received and Scheduling Request sent until 4 ms prior to symbol n
      when evaluating all DRX Active Time conditions as specified in this clause:
      3> not transmit periodic SRS and semi-persistent SRS defined in TS 38.214 [7];
      3> not report semi-persistent CSI configured on PUSCH;
      3> if ps-TransmitPeriodicL1-RSRP is not configured with value true:
         4> not report periodic CSI that is L1-RSRP on PUCCH.
      3> if ps-TransmitOtherPeriodicCSI is not configured with value true:
         4> not report periodic CSI that is not L1-RSRP on PUCCH.
1> else:
   2> in current symbol n, if a DRX group would not be in Active Time considering grants/assignments
      scheduled on Serving Cell(s) in this DRX group and DRX Command MAC CE/Long DRX Command
      MAC CE received and Scheduling Request sent until 4 ms prior to symbol n when evaluating all DRX
      Active Time conditions as specified in this clause:
      3> not transmit periodic SRS and semi-persistent SRS defined in TS 38.214 [7] in this DRX group;
      3> not report CSI on PUCCH and semi-persistent CSI configured on PUSCH in this DRX group.
   2> if CSI masking (csi-Mask) is setup by upper layers:
      3> in current symbol n, if drx-onDurationTimer of a DRX group would not be running considering
      grants/assignments scheduled on Serving Cell(s) in this DRX group and DRX Command MAC
      CE/Long DRX Command MAC CE received until 4 ms prior to symbol n when evaluating all DRX
      Active Time conditions as specified in this clause; and
         4> not report CSI on PUCCH in this DRX group.
NOTE 4: If a UE multiplexes a CSI configured on PUCCH with other overlapping UCI(s) according to the
      procedure specified in TS 38.213 [6] clause 9.2.5 and this CSI multiplexed with other UCI(s) would be
      reported on a PUCCH resource outside DRX Active Time of the DRX group in which this PUCCH is
      configured, it is up to UE implementation whether to report this CSI multiplexed with other UCI(s).
Regardless of whether the MAC entity is monitoring PDCCH or not on the Serving Cells in a DRX group, the MAC
entity transmits HARQ feedback, aperiodic CSI on PUSCH, and aperiodic SRS defined in TS 38.214 [7] on the
Serving Cells in the DRX group when such is expected.
The MAC entity needs not to monitor the PDCCH if it is not a complete PDCCH occasion (e.g. the Active Time starts
or ends in the middle of a PDCCH occasion).

On the other hand, in NR V2X of Release 16, a power saving operation of a UE was not supported, a power saving operation of a UE (e.g., a power saving UE) will be supported from Release 17 NR V2X.

In the embodiment(s) of the present disclosure, an operation method in which a receiving UE performs power saving is proposed. In the following description, 'when, if, in case of' may be replaced with 'based on'.

For example, a P-UE described in this disclosure refers to a power saving UE that performs a power saving operation (e.g., a sidelink (SL) DRX operation), a V-UE may refer to a vehicle UE that does not perform a power saving operation (e.g., an SL DRX operation).

According to an embodiment of the present disclosure, when a transmitting UE transmits an HARQ feedback (enabled) MAC PDU to a receiving UE, during a time GAP between a PSSCH initial transmission and a PSFCH, the receiving UE may perform a sleep operation related to an SL HARQ process linked to the PSSCH (or PSCCH). Or, for example, when a transmitting UE transmits a HARQ feedback enabled MAC PDU to a receiving UE, during a time GAP between an initial transmission of a PSSCH and a PSFCH, the receiving UE may not perform a PSCCH/PSSCH monitoring operation, transmitted by the transmitting UE related to an SL HARQ process linked to a PSSCH (or PSCCH) or a monitoring operation for an SL transmission of a transmitting UE.

According to an embodiment of the present disclosure, when a transmitting UE transmits a HARQ feedback enabled MAC PDU to a receiving UE, when a time GAP (time GAP including an initial transmission resource) between an initial PSSCH transmission and a PSSCH retransmission is greater than 32 slots, the receiving UE may perform a sleep operation related to the SL HARQ process linked to the PSSCH in a section between the PSFCH for the PSSCH retransmission and the PSSCH retransmission. For example, for the sleep operation, a sleep-related time window or a minimum processing time value may be configured/defined in advance. For example, in the case of unicast, a minimum processing time value information may be transmitted through PC5 RRC. Alternatively, for example, the sleep operation may be performed based on a timer.

Or, for example, when a transmitting UE transmits a HARQ feedback enabled MAC PDU to a receiving UE, if a time GAP between an initial PSSCH transmission and a PSSCH retransmission (time GAP including an initial transmission resource) is greater than 32 slots, the receiving UE may not perform a monitoring operation for a PSCCH/PSSCH transmitted by the transmitting UE or a monitoring operation for an SL transmission of the transmitting UE, related to the SL HARQ process linked to the PSSCH, in an interval between a PSFCH for the PSSCH retransmission and the PSSCH retransmission. For example, for an operation in which the receiving UE does not perform a monitoring operation, a sleep-related time window or a minimum processing time value may be configured/defined in advance. Alternatively, for example, an operation in which the receiving UE does not perform a monitoring operation may be performed based on a timer.

For example, information related to a retransmission resource of a PSSCH transmitted through SCI may include information related to a resource from the end of a PSSCH resource related to the SCI to the maximum 31 slot positions. That is, when a PSSCH resource related to SCI is transmitted in slot A, the SCI may indicate a retransmission resource related to the PSSCH resource up to A+31 slots. That is, when a retransmission resource of a PSSCH resource related to SCI exists after 31 slots (after slot A+32) from the end of the PSSCH resource, the SCI may not include information related to a retransmission resource.

Figure 8:
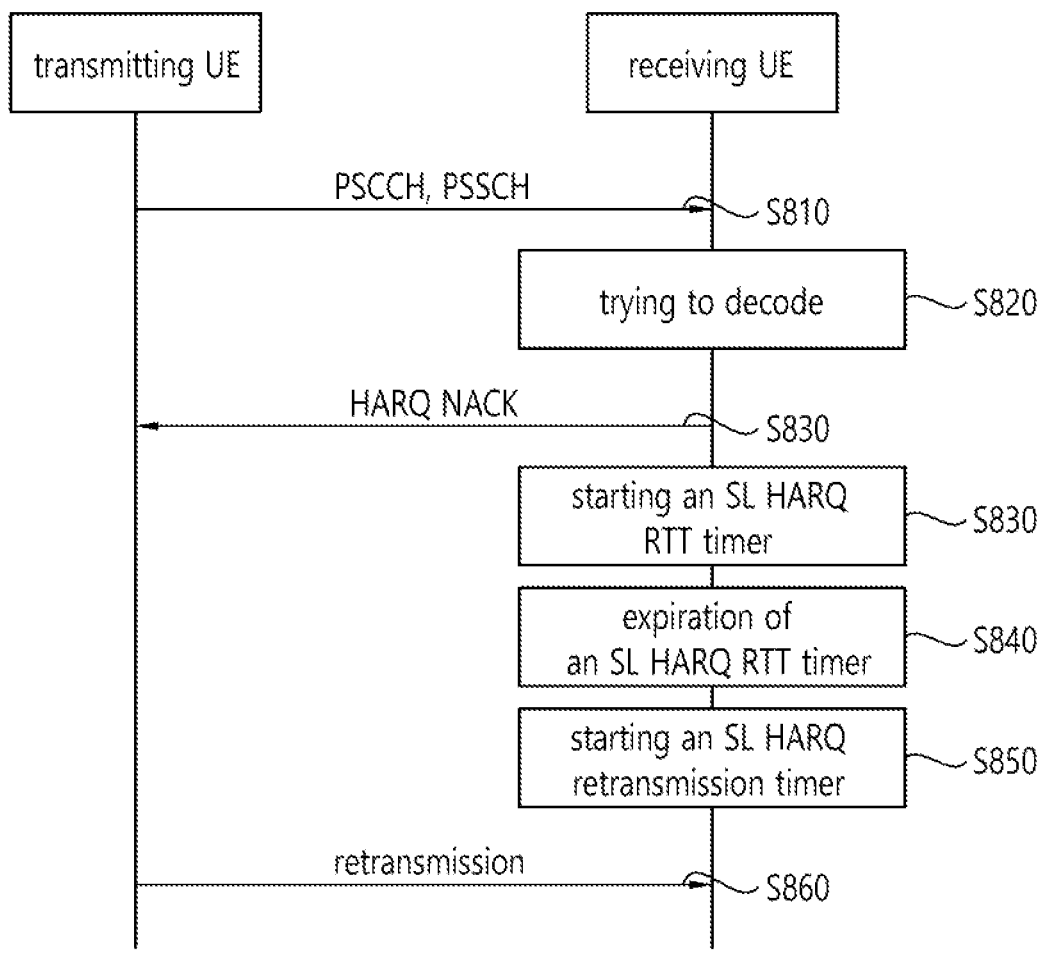
FIG. 8 shows an example of a retransmission procedure according to an SL DRX operation, according to an embodiment of the present disclosure.

FIG. 8 shows an example of a retransmission procedure according to an SL DRX operation, according to an embodiment of the present disclosure. The embodiment of FIG. 8 may be combined with various embodiments of the present disclosure.

Referring to FIG. 8, a flowchart in which a receiving UE performing SL DRX operation and a transmitting UE performing SL communication is shown. In step S810, the transmitting UE may perform PSCCH and PSSCH transmission to the receiving UE. That is, for example, the transmitting UE may transmit an SCI for scheduling the PSSCH through the PSCCH to the receiving UE, and transmit a MAC PDU through the PSSCH. In step S820, the receiving UE may receive the SCI and attempt to decode a MAC PDU based on the SCI. In the embodiment of FIG. 8, it is assumed that the receiving UE fails to decode the MAC PDU.

In step S830, the receiving UE may generate HARQ NACK information based on the decoding failure of the MAC PDU. And, the receiving UE may transmit the HARQ NACK information to the transmitting UE based on a PSFCH resource. In this case, the receiving UE may not perform monitoring for the PSSCH transmission for a predetermined time in order to power saving, before the time when the reception of the retransmission for the PSSCH transmission is expected. For example, the receiving UE may not perform the monitoring for a predetermined time using the SL DRX HARQ RTT timer.

For example, the receiving UE may transmit the HARQ NACK information and start an SL DRX HARQ RTT timer based on an SL DRX configuration. For example, when the SL DRX HARQ RTT timer is running, the receiving UE may operate in a sleep mode.

Alternatively, when the SL DRX HARQ RTT timer is in operation, the receiving UE may not perform monitoring for retransmission related to the HARQ NACK. Here, the SL DRX HARQ RTT timer may be operated according to various embodiments of the present disclosure.

In step S840, the SL HARQ RTT timer may expire. In step S850, based on the expiration of the SL HARQ RTT timer, the receiving UE may start an SL DRX retransmission timer. For example, based on that the SL DRX retransmission timer is in operation, the receiving UE may operate in an active mode. Or, for example, based on that the SL DRX retransmission timer is running, the receiving UE may perform monitoring for retransmission related to the HARQ NACK.

In step S850, the receiving UE may receive a retransmission related to the HARQ NACK based on that the SL DRX retransmission timer is running. For example, in the embodiment of FIG. 8, since the receiving UE does not perform monitoring while the SL HARQ RTT timer is running, power saving effect may be improved.

Figure 9:
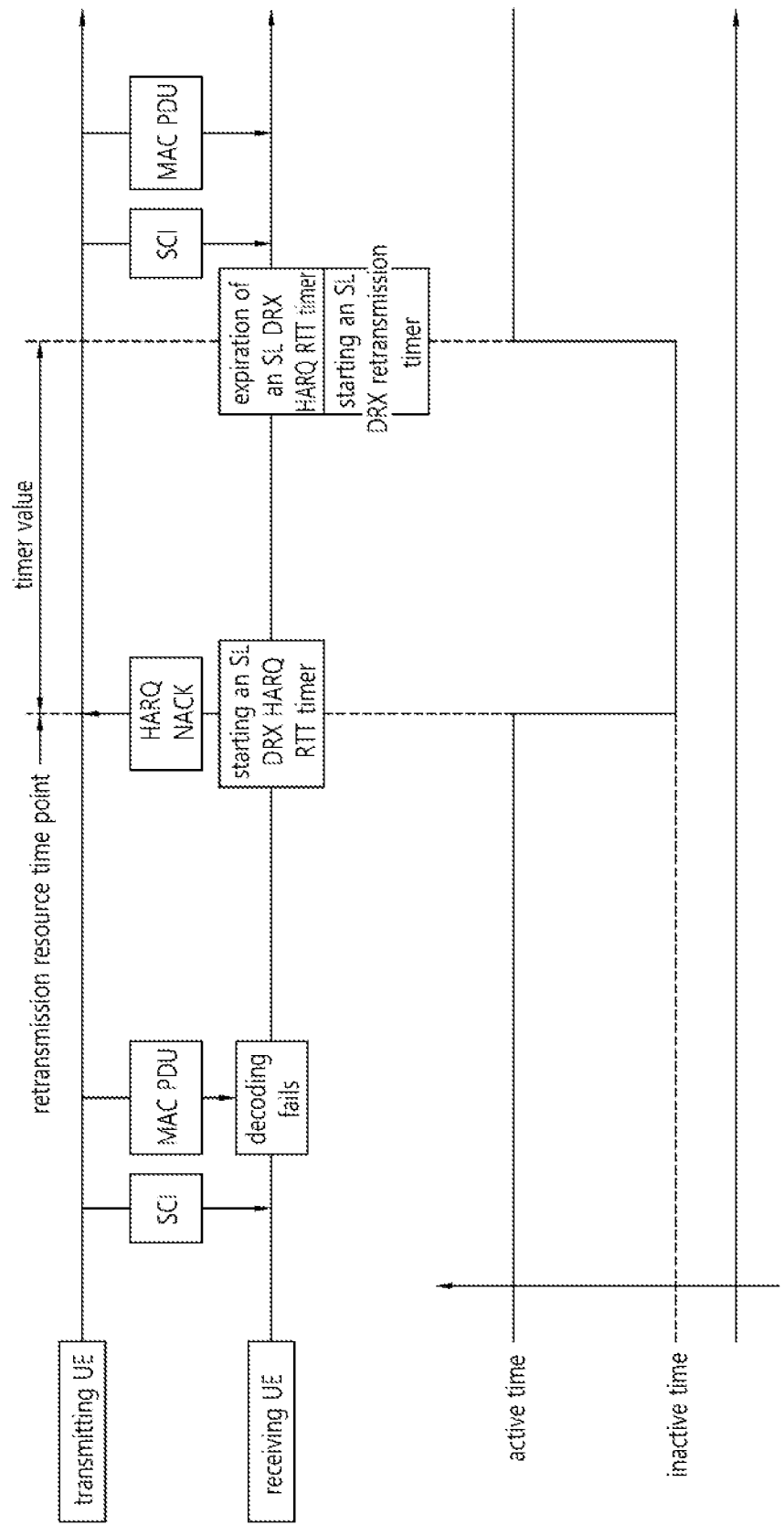
FIG. 9 shows an example of a retransmission procedure according to an SL DRX operation, according to an embodiment of the present disclosure.

FIG. 9 shows an example of a retransmission procedure according to an SL DRX operation, according to an embodiment of the present disclosure. The embodiment of FIG. 9 may be combined with various embodiments of the present disclosure.

Referring to FIG. 9, SL communication procedures performed by a receiving UE performing an SL DRX operation and a transmitting UE according to the passage of time are shown. The active time of FIG. 9 indicates an active time interval according to an SL DRX configuration of the receiving UE, and an inactive time of FIG. 9 indicates a time interval other than the active time. For example, in the active time, the receiving UE may perform monitoring for SL communication, and in the inactive time, the receiving UE may not perform monitoring for SL communication. Based on the inactive time, the power saving effect of the receiving UE may be improved. In the embodiment of FIG. 9, it is assumed that decoding of a MAC PDU of the transmitting UE fails.

For example, in an active time, the transmitting UE may transmit an SCI and a MAC PDU related to the SCI to the receiving UE. Here, the SCI may not include information related to a retransmission resource related to the retransmission of the MAC PDU. For example, that the SCI does not include information related to a retransmission resource may be because the SCI cannot include information on the retransmission resource since the retransmission resource related to the retransmission of the MAC PDU exists 31 slots after the resource through which the SCI and the MAC PDU are transmitted.

Here, for example, the receiving UE may fail to decode the MAC PDU. And, the receiving UE may generate HARQ NACK information based on the decoding failure. In addition, the receiving UE may transmit the HARQ NACK information to the transmitting UE through a PSFCH resource in the active time. And, the receiving UE may start an SL DRX HARQ RTT timer from the PSFCH resource. Thereafter, the SL DRX HARQ RTT timer may expire after a specific timer value. The specific timer value may be (pre)configured for the receiving UE.

For example, the period during which the SL DRX HARQ RTT timer is operating may be an inactive time of the receiving UE. After the SL DRX HARQ RTT timer is started and expires after the specific timer value has elapsed, the receiving UE may start an SL DRX retransmission timer. The period during which the SL DRX retransmission timer is running may be an active time of the receiving UE. For example, in an active time during which the SL DRX retransmission timer is running, the receiving UE may receive a retransmission of the MAC PDU and related SCI from the transmitting UE.

According to an embodiment of the present disclosure, only when an initial PSSCH transmission of a transmitting UE signals a PSSCH retransmission through SCI, the receiving UE may perform a sleep operation related to an SL HARQ process linked (to the PSSCH) in the time interval between an initial PSSCH transmission and a PSFCH, and the time interval between a PSFCH and a PSSCH retransmission. For example, that the PSSCH retransmission is signaled through the SCI may mean that the SCI includes information related to a retransmission resource related to the PSSCH retransmission.

Or, for example, only when an initial transmission of a PSSCH of a transmitting UE signals PSSCH retransmission through SCI, the receiving UE may not perform a monitoring operation for a PSCCH/PSSCH transmitted by the transmitting UE, or a monitoring operation for an SL transmission of the transmitting UE, related to an SL HARQ process linked (to the PSSCH), in the time interval between an initial PSSCH transmission and a PSFCH, and the time interval between a PSFCH and a PSSCH retransmission. For example, that the PSSCH retransmission is signaled through the SCI may mean that the SCI includes information related to a retransmission resource related to the PSSCH retransmission.

Figure 10:
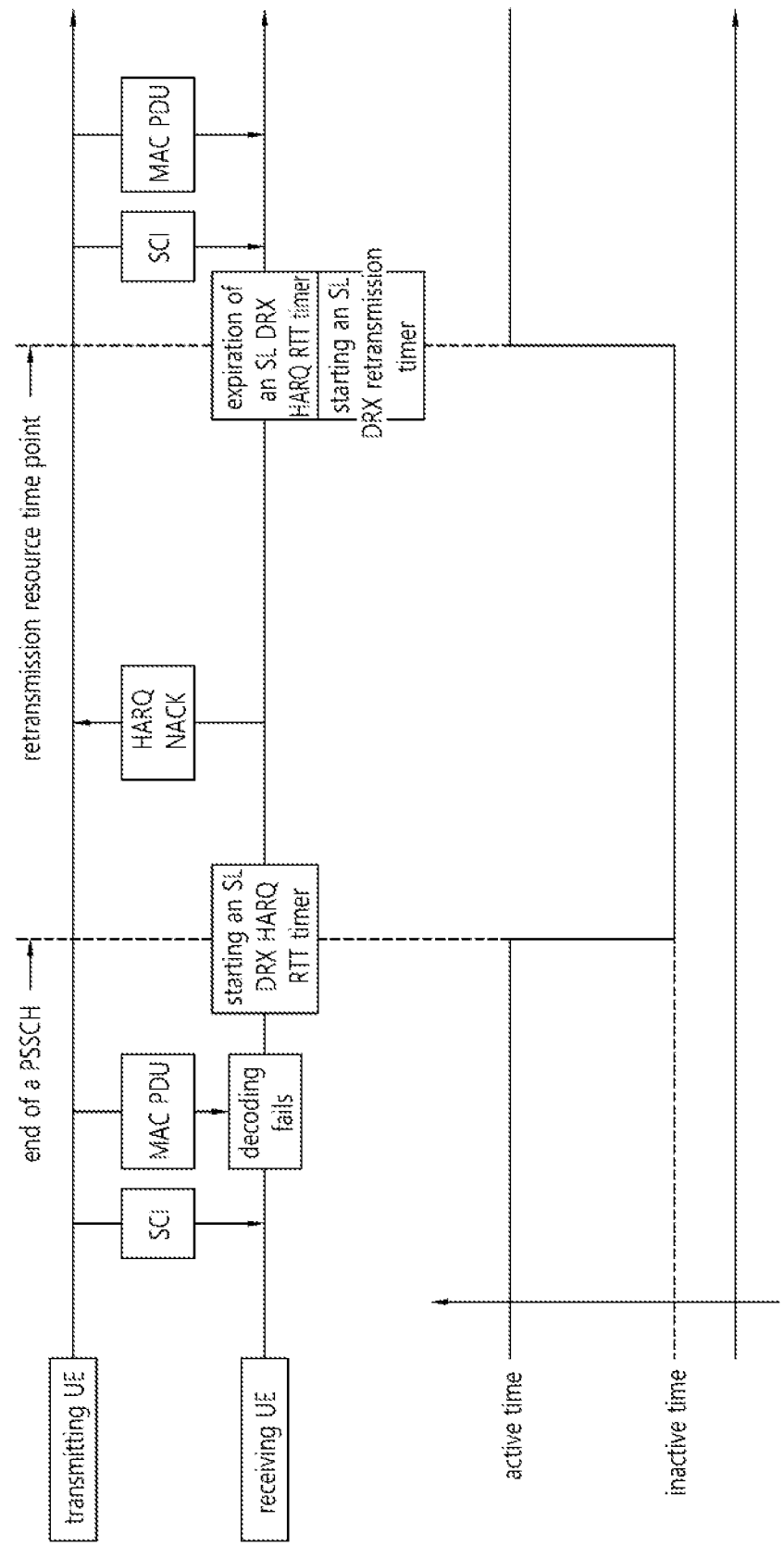
FIG. 10 shows an example of a retransmission procedure according to an SL DRX operation, according to an embodiment of the present disclosure.

FIG. 10 shows an example of a retransmission procedure according to an SL DRX operation, according to an embodiment of the present disclosure. The embodiment of FIG. 10 may be combined with various embodiments of the present disclosure.

Referring to FIG. 10, SL communication procedures performed by a receiving UE performing an SL DRX operation and a transmitting UE according to the passage of time are shown. An active time of FIG. 10 indicates an active time interval according to an SL DRX configuration of the receiving UE, and an inactive time of FIG. 10 indicates a time interval other than the active time. For example, in the active time, the receiving UE may perform monitoring for SL communication, and in the inactive time, the receiving UE may not perform monitoring for SL communication. Based on the inactivity time, the power saving effect of the receiving UE may be improved. In the embodiment of FIG. 10, it is assumed that decoding of a MAC PDU of the transmitting UE fails.

For example, in an active time, the transmitting UE may transmit an SCI and a MAC PDU related to the SCI to the receiving UE. Here, the SCI may include information related to a retransmission resource related to a retransmission of the MAC PDU. For example, the MAC PDU may be received through a PSSCH scheduled by the SCI.

Here, for example, the receiving UE may fail to decode the MAC PDU. And, the receiving UE may generate HARQ NACK information based on the decoding failure. And, the receiving UE may start an SL DRX HARQ RTT timer from the end of the PSSCH resource. In addition, the receiving UE may transmit the HARQ NACK information to the transmitting UE through a PSFCH resource. Thereafter, the SL DRX HARQ RTT timer may expire before a retransmission resource included in information related to a retransmission resource included in the SCI.

For example, the period during which the SL DRX HARQ RTT timer is running may be an inactive time of the receiving UE. When the SL DRX HARQ RTT timer is started and expires before the retransmission resource, the receiving UE may start an SL DRX retransmission timer. The period during which the SL DRX retransmission timer is running may be an active time of the receiving UE. For example, the receiving UE may receive a retransmission of the MAC PDU and related SCI from the transmitting UE based on the retransmission resource. Or, for example, in an active time during which the SL DRX retransmission timer is running, the receiving UE may receive a retransmission of the MAC PDU and related SCI from the transmitting UE.

On the other hand, SL DRX operation may be supported in Release 17 NR V2X. In the embodiment(s) of the present disclosure, an operating method for a receiving UE to start an SL HARQ RTT timer when a transmitting UE transmits a HARQ feedback disabled MAC PDU is proposed.

For example, a UE performing SL DRX operation may operate in an active mode in a DRX active time (e.g., an on-duration timer, an inactivity timer, a retransmission timer, or a section operating in active mode) and perform PSCCH/PSSCH monitoring. On the other hand, the UE operates in a sleep mode in an SL DRX inactive time period, and thus may not perform a PSCCH/PSSCH monitoring operation for SL data reception.

For example, in SL unicast, a UE may negotiate/determine SL DRX configuration with a counterpart UE in which a unicast connection is established. For example, the SL DRX configuration may be an SL DRX configuration to be used during SL unicast communication. For example, when a transmitting UE has a connection (RRC connection) with a base station, the base station may configure an SL DRX configuration to be used by a receiving UE that has established a unicast connection with the transmitting UE and notifies the transmitting UE, and the transmitting UE may transmit the SL DRX configuration received from the base station to the receiving UE through a PC5 RRC message. For example, if there is no connection (RRC connection) between a transmitting UE and a base station, the transmitting UE directly configures an SL DRX configuration to be used by a receiving UE that has directly established a unicast connection with the transmitting UE, and the transmitting UE may transfer it through a PC5 RRC message to the receiving UE.

For example, an SL DRX operation is an operation for a receiving UE, since a transmitting UE must also know an SL DRX operation status (active mode, sleep mode, start time of DRX on-duration/inactivity/HARQ RTT/retransmission timer, or expiration time of DRX on-duration/inactivity/HARQ RTT/retransmission timer, etc.) of a receiving UE (e.g., when resource allocation and transmission, it must be possible to determine whether a receiving UE is operating in an active mode or a sleep mode), by applying an SL DRX configuration to the transmitting UE in the same way as the receiving UE, the transmitting UE may maintain the same operating state as the receiving UE, such as an SL DRX timer.

For example, an AS layer of a UE (a receiving UE, or a transmitting UE) supporting an SL DRX operation may receive a Tx profile mapped to an available SL service from a higher layer (e.g., V2X layer). For example, a Tx profile may include information for discriminating whether or not an SL service for which an SL DRX operation is to be performed on an available SL service or an SL service of interest. Therefore, when an AS layer of a UE receives an available SL data (or an SL service of interest) and a Tx profile from an upper layer, the AS layer may determine (or judge) whether or not the SL DRX operation should be supported for the available SL data (or the SL service of interest).

For example, a transmission UE performing SL transmission (or resource (re)selection operation) based on SL mode 2 resource allocation operation may perform a process of reselecting a transmission resource reserved for a previous SL data (or a previous SL TB). For example, a transmitting UE may perform an operation of reselecting a transmission resource reserved for previous SL data (or previous SL TB) due to an SL dropping by preemption or UL/SL prioritization or an NR SL drop or congestion control by NR SL/LTE SL prioritization.

For example, a transmitting UE may transmit up to three pieces of resource information, including resource information related to the currently transmitted PSSCH and two retransmission resources, in SCI to a receiving UE.

For example, when a transmitting UE transmits an HARQ feedback disabled MAC PDU to a receiving UE, if the receiving UE determines that the MAC PDU is HARQ feedback disabled based on a HARQ feedback mode indicator included in SCI, the receiving UE may monitor a PSCCH/PSSCH additionally transmitted by the transmitting UE without transmitting SL HARQ feedback to the transmitting UE even after receiving the PSCCH/PSSCH. For example, a transmitting UE may also perform additional PSCCH/PSSCH transmission without receiving HARQ feedback (ACK or NACK) from a receiving UE when transmitting a HARQ feedback disabled MAC PDU. For example, the operation may be a blind transmission.

For example, when a receiving UE performing an SL DRX operation receives a HARQ feedback enabled MAC PDU, or when a receiving UE determines that the MAC PDU is HARQ feedback enabled based on a HARQ feedback mode indicator included in SCI, after transmitting a PSFCH, the receiving UE may start an SL HARQ RTT timer and operate in a sleep mode until the SL HARQ RTT timer expires. Also, for example, when the SL HARQ RTT timer expires, the receiving UE may start an SL retransmission timer, operate in an active mode, and monitor a PSCCH/PSSCH transmitted by a transmitting UE.

On the other hand, for example, according to the prior art, when a receiving UE performing an SL DRX operation receives a HARQ feedback disabled MAC PDU (confirms that the MAC PDU is HARQ feedback disabled based on a HARQ feedback mode indicator included in SCI), the time when the receiving UE starts an SL HARQ RTT timer is not defined.

For example, when transmitting a HARQ feedback disabled MAC PDU, a transmitting UE may transmit SL data by selecting a resource pool in which a PSFCH resource is not configured or a resource pool in which a PSFCH resource is configured. That is, the transmitting UE may select a resource pool in which a PSFCH resource is configured or may select a resource pool in which a PSFCH resource is not configured.

In the embodiment (s) of the present disclosure, an operation method for an SL HARQ RTT timer start time of a receiving UE is proposed, when a transmitting UE transmits a HARQ feedback disabled MAC PDU.

According to an embodiment of the present disclosure, in the present disclosure, when a receiving UE performing an SL DRX operation receives a HARQ feedback disabled MAC PDU (PSCCH/PSSCH), if SCI related to the received MAC PDU does not include information related to a next resource (e.g., a next retransmission resource), a method in which the receiving UE applies a different starting point of an SL DRX HARQ RTT timer is proposed, according to whether the MAC PDU transmitted by a transmitting UE is transmitted using a resource pool in which PSFCH resources are configured or is transmitted using a resource pool in which PSFCH resources are not configured.

For example, when a receiving UE receives a HARQ feedback disabled MAC PDU (PSCCH/PSSCH), if it is confirmed that SCI related to the received MAC PDU does not contain information related to a next resource (e.g., the next retransmission resource) and there is no PSFCH resource (in the resource pool), the receiving UE may start an SL HARQ RTT timer at the next (slot) of the resource location where the SCI is received. For example, the receiving UE may start an SL DRX HARQ RTT timer in the next slot of the PSSCH resource.

According to an embodiment of the present disclosure, when a transmitting UE selects a resource pool in which a PSFCH resource is configured, the transmitting UE may have to select a resource such that a minimum time GAP is guaranteed between two selected resources. For example, the minimum time GAP may mean a time GAP between the end of the last symbol of a PSSCH transmission of a first resource and the starting point of the first symbol of the corresponding PSFCH reception, as determined by sl-MinTimeGapPSFCH and sl-PSFCH-Period of the resource pool.

Therefore, for example, when a receiving UE receives a HARQ feedback disabled MAC PDU (PSCCH/PSSCH), if it is confirmed that SCI related to a received MAC PDU does not contain information related to a next resource (e.g., the next retransmission resource) and there is a PSFCH resource (in the resource pool), the receiving UE may start an SL HARQ RTT timer in the next (slot) of a PSFCH resource location. For example, a receiving UE may start an SL DRX HARQ RTT timer in the next slot of a PSFCH resource.

The operation of the present disclosure may be a solution applicable to all SL unicast/groupcast/broadcast operations.

The following SL DRX configuration and SL DRX timers mentioned in this disclosure may be used for the following purposes.

TABLE 15

Sidelink DRX configurations
SL drx-onDurationTimer: the duration at the beginning of a SL DRX Cycle;
SL drx-SlotOffset: the delay before starting the sl drx-onDurationTimer;
SL drx-InactivityTimer: the duration after the PSCCH occasion in which a
    PSCCH indicates a new SL transmission for the MAC entity;
SL drx-StartOffset: the subframe where the SL DRX cycle start;
SL drx-Cycle: the SL DRX cycle;
SL drx-HARQ-RTT-Timer (per HARQ process or per sidelink process): the
    minimum duration before an assignment for HARQ retransmission
    is expected by the MAC entity.
SL drx-RetransmissionTimer (per HARQ process or per sidelink process):
    the maximum duration until a retransmission is received SL DRX on-duration timer: it may indicate a period in which a UE performing an SL DRX operation should basically operate as an active time in order to receive a PSCCH/PSSCH of a counterpart UE.

SL DRX inactivity timer: it may indicate a period in which a UE performing an SL DRX operation extends an SL DRX on-duration period, which is a period in which an active time is basically required to receive a PSCCH/PSSCH of a counterpart UE. That is, an SL DRX on-duration timer may be extended by an SL DRX inactivity timer period. In addition, when a UE receives anew packet (transmission of a new PSSCH) from another UE, the UE may extend an SL DRX on-duration timer by starting an SL DRX inactivity timer.

SL DRX HARQ RTT timer: it may indicate a period in which a UE performing an SL DRX operation operates in a sleep mode until it receives a retransmission packet (or PSSCH assignment) transmitted from a counterpart UE. That is, when a UE starts an SL DRX HARQ RTT timer, the UE determines that other UEs will not transmit an SL retransmission packet to itself until the SL DRX HARQ RTT timer expires, and may operate in sleep mode during the timer.

SL DRX retransmission timer: it may indicate a period in which a UE performing SL DRX operation operates as an active time to receive a retransmission packet (or PSSCH allocation) transmitted by a counterpart UE. For example, when an SL DRX HARQ RTT timer expires, an SL DRX retransmission timer may be started. During the corresponding timer period, a UE may monitor reception of a retransmission SL packet (or PSSCH allocation) transmitted by a counterpart UE.

The following Uu DRX timer mentioned in this disclosure may be used for the following purposes.

Uu DRX HARQ RTT TimerSL(drx-HARQ-RTT-TimerSL): it may indicate a section in which a transmitting UE (a UE supporting Uu DRX operation) performing SL communication based on SL resource allocation mode 1 does not perform PDCCH (or DCI) monitoring for SL mode 1 resource allocation from a base station.

Uu DRX retransmission TimerSL(drx-Retransmission-TimerSL): it may indicate a period in which a transmitting UE (a UE that supports Uu DRX operation) performing SL communication based on SL resource allocation mode 1 performs PDCCH (or DCI) monitoring for SL mode 1 resource allocation from a base station.

In the following description, the names of timers (Uu DRX HARQ RTT TimerSL, Uu DRX Retransmission TimerSL, SL DRX On-Duration Timer, SL DRX Inactivity Timer, SL DRX HARQ RTT Timer, SL DRX Retransmission Timer, etc.) are exemplary, and timers that perform the same/similar functions based on the contents described in each timer may be regarded as the same/similar timers regardless of their names.

The proposal of the present disclosure is a solution that can be applied and expanded as a method to solve the problem of loss due to interference occurring during Uu bandwidth part (BWP) switching.

In addition, when a UE supports SL multiple BWP, it is a solution that can be applied and expanded as a method to solve the problem of loss due to interference occurring during SL BWP switching.

The proposal of the present disclosure may be extended and applied not only to a parameter (and timer) included in a default/common SL DRX configuration or default/common SL DRX patterns or default/common SL DRX configuration, but also to parameters (and timers) included in UE pair-specific SL DRX configuration or UE pair-specific SL DRX pattern or UE pair-specific SL DRX configuration.

Also, for example, an on-duration term mentioned in the proposal of the present disclosure may be interpreted as an active time interval, and an off-duration term may be extended and interpreted as a sleep time interval. For example, an active time may mean a period in which a UE operates in a wake up state (a state in which an RF module is On) in order to receive/transmit a wireless signal. For example, a sleep time may mean a period in which a UE operates in a sleep mode state (a state in which an RF module is Off) for power saving. For example, a sleep time period does not mean that a transmitting UE must operate in a sleep mode compulsorily. That is, if necessary, even in a sleep time period, a UE may be allowed to operate for a short time in an active time to perform a sensing operation/transmission operation.

In addition, for example, whether the (some) proposed method/rule of the present disclosure is applied and/or related parameters (e.g., threshold) may be configured specifically (or differently, or independently) according to a resource pool, congestion level, service priority (and/or type), QoS requirements (e.g. delay, reliability) or PQI, traffic type (e.g. (non)periodic generation), SL transmission resource allocation mode (Mode 1, Mode 2), Tx profile (e.g., Tx profile indicating that the service supports SL DRX operation, a Tx profile indicating that the service does not need to support SL DRX operation), etc.

For example, whether the proposed rule of the present disclosure is applied (and/or related parameter configuration value) may be configured specifically (and/or independently and/or differently) for at least one of a resource pool (e.g., resource pool with a PSFCH configured, resource pool without a PSFCH configured), service/packet type (and/or priority), QoS profile or QoS requirements (e.g., URLLC/EMBB traffic, reliability, delay), PQI, PFI, cast type (e.g., unicast, groupcast, broadcast), (resource pool) congestion level (e.g., CBR), SL HARQ feedback scheme (e.g., NACK Only feedback), ACK/NACK feedback), the case of HARQ feedback enabled MAC PDU (and/or HARQ feedback disabled MAC PDU) transmission, the case of PUCCH-based SL HARQ feedback reporting operation configuration, preemption (and/or re-evaluation) (non) performance (or based resource reselection), (L2 or L1) (source and/or destination) identifier, (L2 or L1) (combination of source layer ID and destination layer ID) identifier, (L2 or L1) (source layer ID and destination layer ID pair, and cast type combination) identifier, a direction of a pair of source layer ID and destination layer ID, PC5 RRC connection/link, SL DRX (non) performing (or supporting) case, an SL mode type (resource allocation mode 1, resource allocation mode 2), (a)periodic resource reservation execution, a Tx profile (e.g., Tx profile indicating that the service supports SL DRX operation, Tx profile indicating that the service does not need to support SL DRX operation).

For example, a constant time term mentioned in the proposal of this disclosure may indicate a time during which a UE operates as an active time for a predefined time, or operates as an active time for a time or a specific timer (SL DRX retransmission timer, SL DRX inactivity timer, or a timer that guarantees to operate as active time in a DRX operation of a receiving UE) time in order to receive an SL signal or SL data from a counterpart UE.

Also, for example, whether the proposal and proposal rule of the present disclosure are applied (and/or related parameter configuration values) may also be applied to mmWave SL operation.

In NR, SL DRX is being discussed as a method for a UE performing SL communication to perform power saving. According to the existing technology, when a retransmission resource is not indicated through SCI, it is not defined for the starting point at which an SL HARQ RTT timer is started, and from the viewpoint of a UE, depending on where the SL HARQ RTT timer is started, a problem such as an increase in the complexity of a UE implementation may occur.

According to an embodiment of the present disclosure, even when SCI does not include a retransmission resource because the retransmission resource is 31 slots from the next slot of the SCI, an SL HARQ RTT timer may operate smoothly. Accordingly, an SL DRX operation can be smoothly performed. In addition, when a retransmission resource is not indicated, since a HARQ RTT timer starts at the end of a PSFCH in both cases where a MAC PDU is feedback enabled/disabled, by a HARQ RTT timer operating from the end of a PSFCH resource, regardless of whether a MAC PDU is feedback enabled/disabled, a UE only needs to operate a HARQ RTT timer from the end of a PSFCH to receive retransmission, thereby reducing the complexity of UE implementation.

Figure 11:
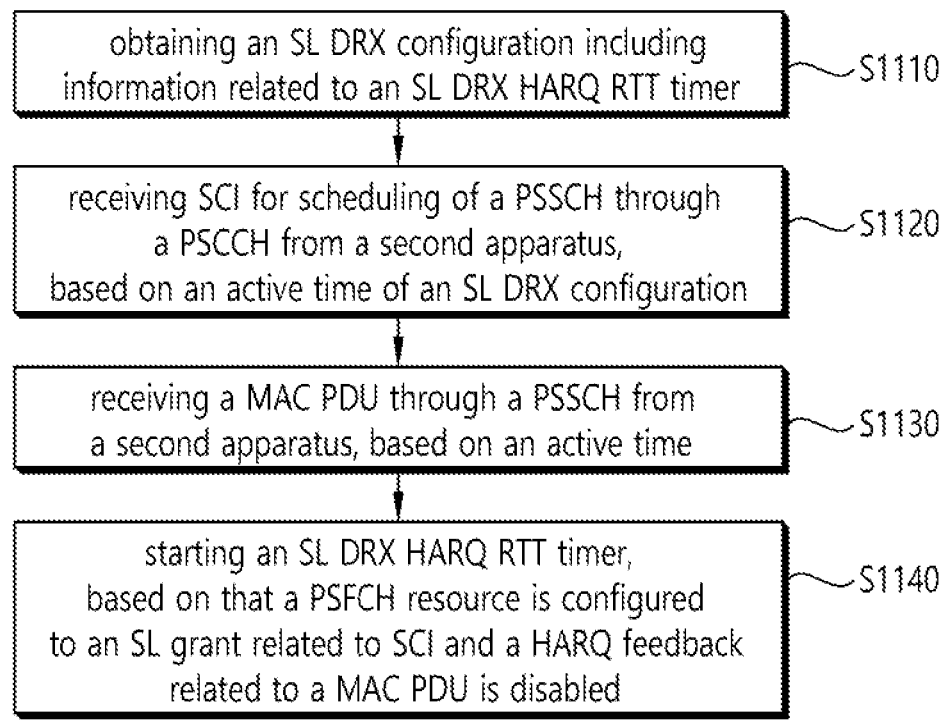
FIG. 11 shows a procedure in which a first apparatus performs wireless communication, according to an embodiment of the present disclosure.

FIG. 11 shows a procedure in which a first apparatus performs wireless communication, according to an embodiment of the present disclosure. The embodiment of FIG. 11 may be combined with various embodiments of the present disclosure.

Referring to FIG. 11, in step S1110, a first apparatus that performs wireless communication may obtain a sidelink (SL) discontinuous reception (DRX) configuration including information related to an SL DRX hybrid automatic repeat request (HARQ) round trip time (RTT) timer. In step S1120, the first apparatus may receive sidelink control information (SCI) for scheduling of a physical sidelink shared channel (PSSCH) through a physical sidelink control channel (PSCCH) from a second apparatus, based on an active time of the SL DRX configuration. In step S1130, the first apparatus may receive a medium access control (MAC) protocol data unit (PDU) of the PSSCH from the second apparatus, based on the active time. In step S1140, the first apparatus may start the SL DRX HARQ RTT timer, based on that a physical sidelink feedback channel (PSFCH) resource is configured to an SL grant related to the SCI and a HARQ feedback related to the MAC PDU is disabled. For example, the SL DRX HARQ RTT timer may be started in a slot following an end of the transmission through the PSSCH, based on that the SCI includes information related to a retransmission resource of the MAC PDU, and the SL DRX HARQ RTT timer may be started in a slot following an end of the PSFCH resource, based on that the SCI doesn't include information related to a retransmission resource of the MAC PDU.

For example, additionally, the first apparatus may receive a retransmission of the MAC PDU, based on that the SL HARQ RTT timer is expired and the retransmission resource.

For example, the operation of receiving the retransmission of the MAC PDU may include: starting an SL HARQ retransmission timer, based on that the SL HARQ RTT timer is expired; and receiving the retransmission of the MAC PDU, based on that the SL HARQ retransmission timer is running and the retransmission resource.

For example, additionally, the first apparatus may transmit HARQ NACK information related to the MAC PDU to the second apparatus, based on the active time.

For example, the first apparatus may not perform a monitoring for a PSCCH of a PSSCH, based on that the SL HARQ RTT timer is running.

For example, the PSCCH or the PSSCH, for which the monitoring is not performed based on that the SL HARQ RTT timer is running, may be related to an SL HARQ process related to the MAC PDU.

For example, the information related to the SL DRX HARQ RTT timer may include an SL DRX HART RTT timer value, and the SL DRX HARQ RTT timer may run as long as the SL DRX HARQ RTT timer value from the next slot of the end of the PSFCH resource, based on that the SCI does not include the information related to the retransmission resource of the MAC PDU.

For example, the SL DRX HARQ RTT timer may run from the next slot of the end of the transmission through the PSSCH until before the retransmission resource time point, based on that the SCI includes the information related to the retransmission resource of the MAC PDU.

For example, additionally, the first apparatus may determine that the retransmission resource of the MAC PDU exists after 32 slots from the SCI, based on that the SCI doesn't include the information related to the retransmission resource of the MAC PDU.

For example, the first apparatus may operate in a sleep mode from a time of transmission of the SCI to a time of the PSFCH resource, based on that the MAC PDU is a HARQ enabled MAC PDU.

For example, the active timer may include an SL DRX on-duration timer and an SL DRX inactivity timer.

For example, the active time may be a time during which the active timer is running.

For example, the SL DRX configuration may be obtained through a PC5RRC message.

The above-described embodiment may be applied to various devices to be described below. For example, a processor (102) of a first apparatus (100) that performs wireless communication may obtain a sidelink (SL) discontinuous reception (DRX) configuration including information related to an SL DRX hybrid automatic repeat request (HARQ) round trip time (RTT) timer. And, the processor (102) of the first apparatus (100) may control a transceiver (106) to receive sidelink control information (SCI) for scheduling of a physical sidelink shared channel (PSSCH) through a physical sidelink control channel (PSCCH) from a second apparatus (200), based on an active time of the SL DRX configuration. And, the processor (102) of the first apparatus (100) may control the transceiver (106) to receive a medium access control (MAC) protocol data unit (PDU) of the PSSCH from the second apparatus (200), based on the active time. And, the processor (102) of the first apparatus (100) may start the SL DRX HARQ RTT timer, based on that a physical sidelink feedback channel (PSFCH) resource is configured to an SL grant related to the SCI and a HARQ feedback related to the MAC PDU is disabled. For example, the SL DRX HARQ RTT timer may be started in a slot following an end of the transmission through the PSSCH, based on that the SCI includes information related to a retransmission resource of the MAC PDU, and the SL DRX HARQ RTT timer may be started in a slot following an end of the PSFCH resource, based on that the SCI doesn't include information related to a retransmission resource of the MAC PDU.

According to an embodiment of the present disclosure, a first apparatus for performing wireless communication may be proposed. For example, the first apparatus may comprise: one or more memories storing instructions; one or more transceivers; and one or more processors connected to the one or more memories and the one or more transceivers. For example, the one or more processors may execute the instructions to: obtain a sidelink (SL) discontinuous reception (DRX) configuration including information related to an SL DRX hybrid automatic repeat request (HARQ) round trip time (RTT) timer; receive sidelink control information (SCI) for scheduling of a physical sidelink shared channel (PSSCH) through a physical sidelink control channel (PSCCH) from a second apparatus, based on an active time of the SL DRX configuration; receive a medium access control (MAC) protocol data unit (PDU) of the PSSCH from the second apparatus, based on the active time; and start the SL DRX HARQ RTT timer, based on that a physical sidelink feedback channel (PSFCH) resource is configured to an SL grant related to the SCI and a HARQ feedback related to the MAC PDU is disabled, wherein the SL DRX HARQ RTT timer is started in a slot following an end of the transmission through the PSSCH, based on that the SCI includes information related to a retransmission resource of the MAC PDU, and wherein the SL DRX HARQ RTT timer is started in a slot following an end of the PSFCH resource, based on that the SCI doesn't include information related to a retransmission resource of the MAC PDU.

For example, additionally, the first apparatus may receive a retransmission of the MAC PDU, based on that the SL HARQ RTT timer is expired and the retransmission resource.

For example, the operation of receiving the retransmission of the MAC PDU may include: starting an SL HARQ retransmission timer, based on that the SL HARQ RTT timer is expired; and receiving the retransmission of the MAC PDU, based on that the SL HARQ retransmission timer is running and the retransmission resource.

For example, additionally, the first apparatus may transmit HARQ NACK information related to the MAC PDU to the second apparatus, based on the active time.

For example, the first apparatus may not perform a monitoring for a PSCCH of a PSSCH, based on that the SL HARQ RTT timer is running.

For example, the PSCCH or the PSSCH, for which the monitoring is not performed based on that the SL HARQ RTT timer is running, may be related to an SL HARQ process related to the MAC PDU.

For example, the information related to the SL DRX HARQ RTT timer may include an SL DRX HART RTT timer value, and the SL DRX HARQ RTT timer may run as long as the SL DRX HARQ RTT timer value from the next slot of the end of the PSFCH resource, based on that the SCI does not include the information related to the retransmission resource of the MAC PDU.

For example, the SL DRX HARQ RTT timer may run from the next slot of the end of the transmission through the PSSCH until before the retransmission resource time point, based on that the SCI includes the information related to the retransmission resource of the MAC PDU.

For example, additionally, the first apparatus may determine that the retransmission resource of the MAC PDU exists after 32 slots from the SCI, based on that the SCI doesn't include the information related to the retransmission resource of the MAC PDU.

For example, the first apparatus may operate in a sleep mode from a time of transmission of the SCI to a time of the PSFCH resource, based on that the MAC PDU is a HARQ enabled MAC PDU.

For example, the active timer may include an SL DRX on-duration timer and an SL DRX inactivity timer.

For example, the active time may be a time during which the active timer is running.

For example, the SL DRX configuration may be obtained through a PC5RRC message.

According to an embodiment of the present disclosure, an apparatus configured to control a first user equipment (UE) may be proposed. For example, the apparatus may comprise: one or more processors; and one or more memories operably connectable to the one or more processors and storing instructions. For example, the one or more processors may execute the instructions to: obtain a sidelink (SL) discontinuous reception (DRX) configuration including information related to an SL DRX hybrid automatic repeat request (HARQ) round trip time (RTT) timer; receive sidelink control information (SCI) for scheduling of a physical sidelink shared channel (PSSCH) through a physical sidelink control channel (PSCCH) from a second UE, based on an active time of the SL DRX configuration; receive a medium access control (MAC) protocol data unit (PDU) of the PSSCH from the second UE, based on the active time; and start the SL DRX HARQ RTT timer, based on that a physical sidelink feedback channel (PSFCH) resource is configured to an SL grant related to the SCI and a HARQ feedback related to the MAC PDU is disabled, wherein the SL DRX HARQ RTT timer is started in a slot following an end of the transmission through the PSSCH, based on that the SCI includes information related to a retransmission resource of the MAC PDU, and wherein the SL DRX HARQ RTT timer is started in a slot following an end of the PSFCH resource, based on that the SCI doesn't include information related to a retransmission resource of the MAC PDU.

According to an embodiment of the present disclosure, a non-transitory computer-readable storage medium storing instructions may be proposed. For example, the instructions, when executed, may cause a first apparatus to: obtain a sidelink (SL) discontinuous reception (DRX) configuration including information related to an SL DRX hybrid automatic repeat request (HARQ) round trip time (RTT) timer; receive sidelink control information (SCI) for scheduling of a physical sidelink shared channel (PSSCH) through a physical sidelink control channel (PSCCH) from a second apparatus, based on an active time of the SL DRX configuration; receive a medium access control (MAC) protocol data unit (PDU) of the PSSCH from the second apparatus, based on the active time; and start the SL DRX HARQ RTT timer, based on that a physical sidelink feedback channel (PSFCH) resource is configured to an SL grant related to the SCI and a HARQ feedback related to the MAC PDU is disabled, wherein the SL DRX HARQ RTT timer is started in a slot following an end of the transmission through the PSSCH, based on that the SCI includes information related to a retransmission resource of the MAC PDU, and wherein the SL DRX HARQ RTT timer is started in a slot following an end of the PSFCH resource, based on that the SCI doesn't include information related to a retransmission resource of the MAC PDU.

Figure 12:
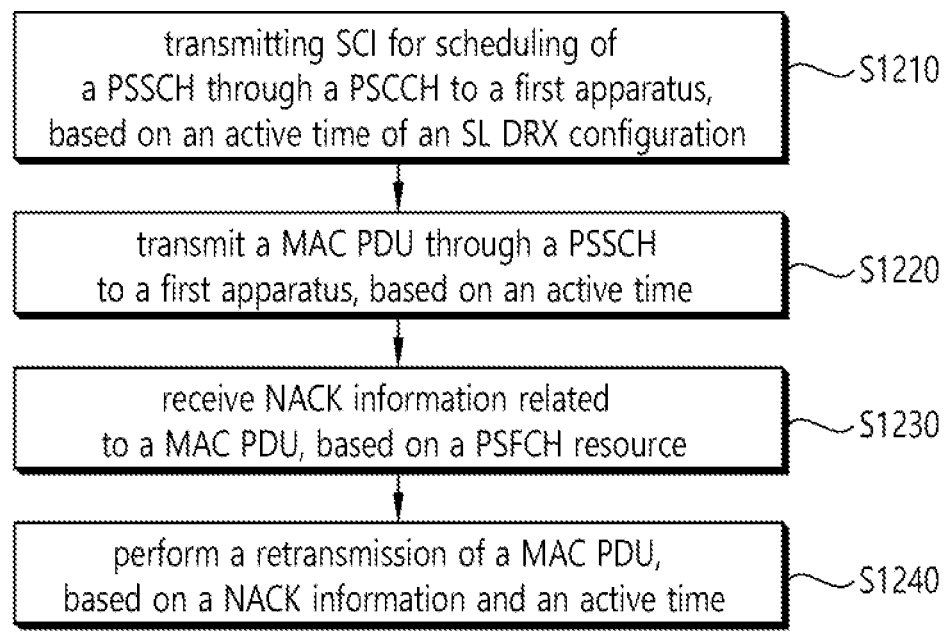
FIG. 12 shows a procedure in which a second apparatus performs wireless communication, according to an embodiment of the present disclosure.

FIG. 12 shows a procedure in which a second apparatus performs wireless communication, according to an embodiment of the present disclosure. The embodiment of FIG. 12 may be combined with various embodiments of the present disclosure.

Referring to FIG. 12, in step S1210, a second apparatus performing wireless communication may transmit sidelink control information (SCI) for scheduling of a physical sidelink shared channel (PSSCH) through a physical sidelink control channel (PSCCH) to a first apparatus, based on an active time of a sidelink (SL) discontinuous reception (DRX) configuration related to an SL DRX operation performed by the first apparatus. In step S1220, the second apparatus may transmit a medium access control (MAC) protocol data unit (PDU) of the PSSCH to the first apparatus, based on the active time. In step S1230, the second apparatus may receive negative acknowledgement (NACK) information related to the MAC PDU, based on a physical sidelink feedback channel (PSFCH) resource. In step S1240, the second apparatus may perform a retransmission of the MAC PDU, based on the NACK information and the active time. For example, the SL DRX configuration may include information related to an SL DRX hybrid automatic repeat request (HARQ) round trip time (RTT) timer, the SL DRX HARQ RTT timer may be started by the first apparatus based on that a physical sidelink feedback channel (PSFCH) resource is configured in an SL grant related to the SCI and that a HARQ feedback related to the MAC PDU is disabled, based on that the SCI includes information related to a retransmission resource of the MAC PDU, the SL DRX HARQ RTT timer may be started in a slot next to an end of transmission through the PSSCH, and based on that the SCI does not include information related to the retransmission resource of the MAC PDU, the SL DRX HARQ RTT timer may be started in a slot next to the end of the PSFCH resource.

For example, based on that the retransmission resource of the MAC PDU exists after 32 slots from the SCI, the SCI may not include information related to the retransmission resource of the MAC PDU.

The above-described embodiment may be applied to various devices to be described below. For example, a processor (202) of a second apparatus (200) may control a transceiver (206) to transmit sidelink control information (SCI) for scheduling of a physical sidelink shared channel (PSSCH) through a physical sidelink control channel (PSCCH) to a first apparatus (100), based on an active time of a sidelink (SL) discontinuous reception (DRX) configuration related to an SL DRX operation performed by the first apparatus. And, the processor (202) of the second apparatus (200) may control the transceiver (206) to transmit a medium access control (MAC) protocol data unit (PDU) of the PSSCH to the first apparatus (100), based on the active time. And, the processor (202) of the second apparatus (200) may control the transceiver (206) to receive negative acknowledgement (NACK) information related to the MAC PDU, based on a physical sidelink feedback channel (PSFCH) resource. And, the processor (202) of the second apparatus (200) may control the transceiver (206) to perform a retransmission of the MAC PDU, based on the NACK information and the active time. For example, the SL DRX configuration may include information related to an SL DRX hybrid automatic repeat request (HARQ) round trip time (RTT) timer, the SL DRX HARQ RTT timer may be started by the first apparatus based on that a physical sidelink feedback channel (PSFCH) resource is configured in an SL grant related to the SCI and that a HARQ feedback related to the MAC PDU is disabled, based on that the SCI includes information related to a retransmission resource of the MAC PDU, the SL DRX HARQ RTT timer may be started in a slot next to an end of transmission through the PSSCH, and based on that the SCI does not include information related to the retransmission resource of the MAC PDU, the SL DRX HARQ RTT timer may be started in a slot next to the end of the PSFCH resource.

According to an embodiment of the present disclosure, a second apparatus for performing wireless communication may be proposed. For example, the second apparatus may comprise: one or more memories storing instructions; one or more transceivers; and one or more processors connected to the one or more memories and the one or more transceivers. For example, the one or more processors may execute the instructions to: transmit sidelink control information (SCI) for scheduling of a physical sidelink shared channel (PSSCH) through a physical sidelink control channel (PSCCH) to a first apparatus, based on an active time of a sidelink (SL) discontinuous reception (DRX) configuration related to an SL DRX operation performed by the first apparatus; transmit a medium access control (MAC) protocol data unit (PDU) of the PSSCH to the first apparatus, based on the active time; receive negative acknowledgement (NACK) information related to the MAC PDU, based on a physical sidelink feedback channel (PSFCH) resource; and perform a retransmission of the MAC PDU, based on the NACK information and the active time, wherein the SL DRX configuration may include information related to an SL DRX hybrid automatic repeat request (HARQ) round trip time (RTT) timer, the SL DRX HARQ RTT timer may be started by the first apparatus based on that a physical sidelink feedback channel (PSFCH) resource is configured in an SL grant related to the SCI and that a HARQ feedback related to the MAC PDU is disabled, based on that the SCI includes information related to a retransmission resource of the MAC PDU, the SL DRX HARQ RTT timer may be started in a slot next to an end of transmission through the PSSCH, and based on that the SCI does not include information related to the retransmission resource of the MAC PDU, the SL DRX HARQ RTT timer may be started in a slot next to the end of the PSFCH resource.

For example, based on that the retransmission resource of the MAC PDU exists after 32 slots from the SCI, the SCI may not include information related to the retransmission resource of the MAC PDU.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
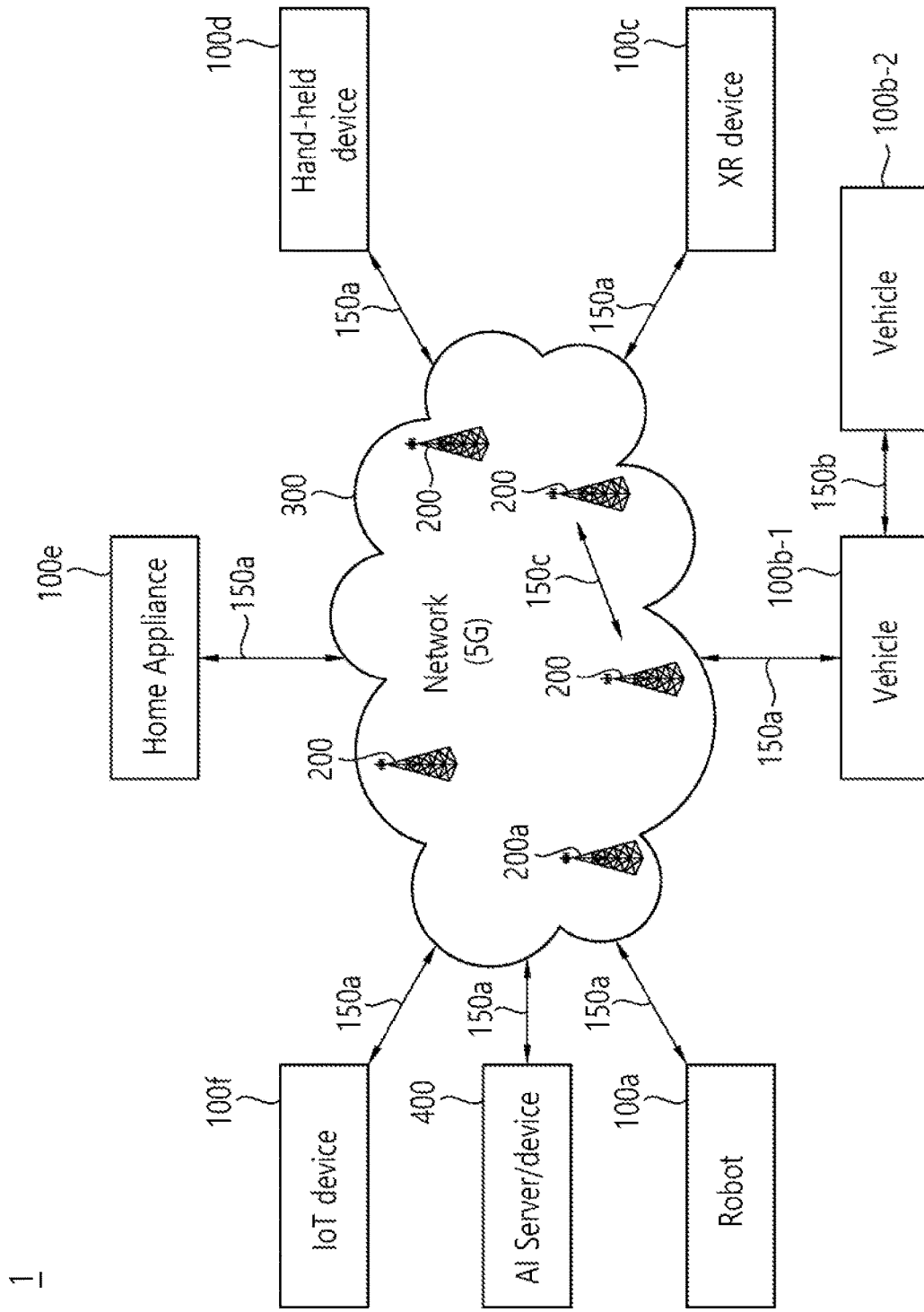
FIG. 13 shows a communication system 1, based on an embodiment of the present disclosure.

FIG. 13 shows a communication system 1, based on an embodiment of the present disclosure. The embodiment of FIG. 13 may be combined with various embodiments of the present disclosure.

Referring to FIG. 13, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
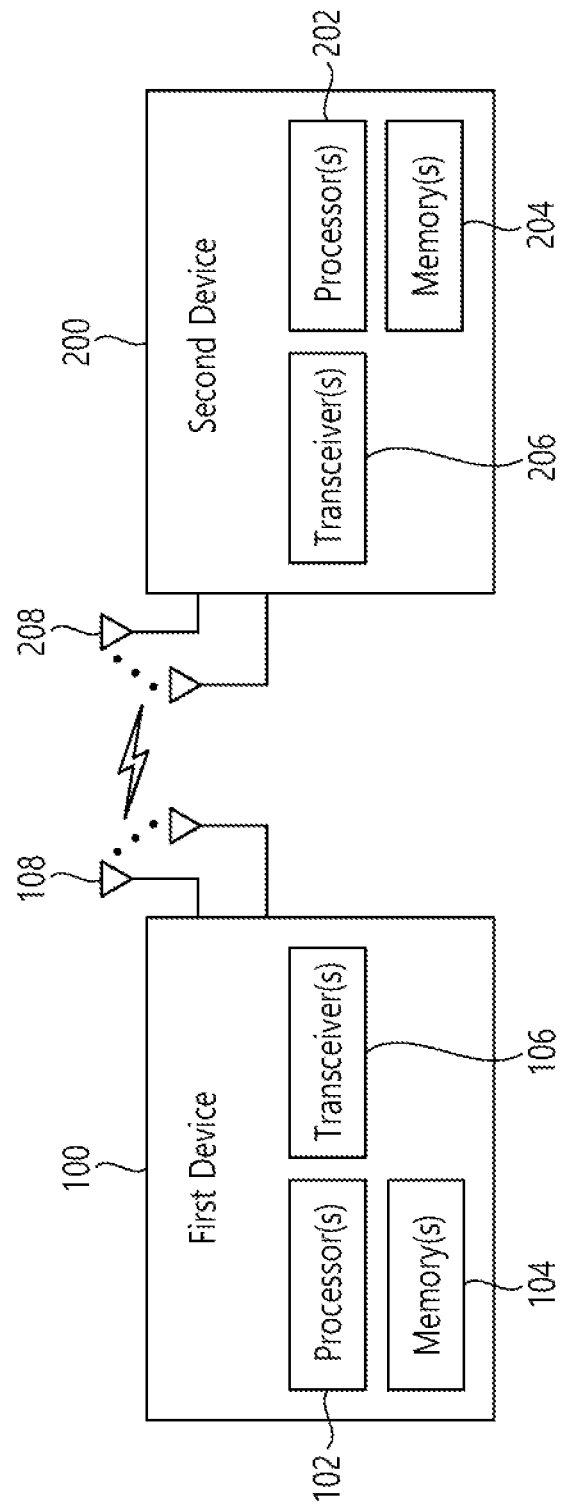
FIG. 14 shows wireless devices, based on an embodiment of the present disclosure.

FIG. 14 shows wireless devices, based on an embodiment of the present disclosure. The embodiment of FIG. 14 may be combined with various embodiments of the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
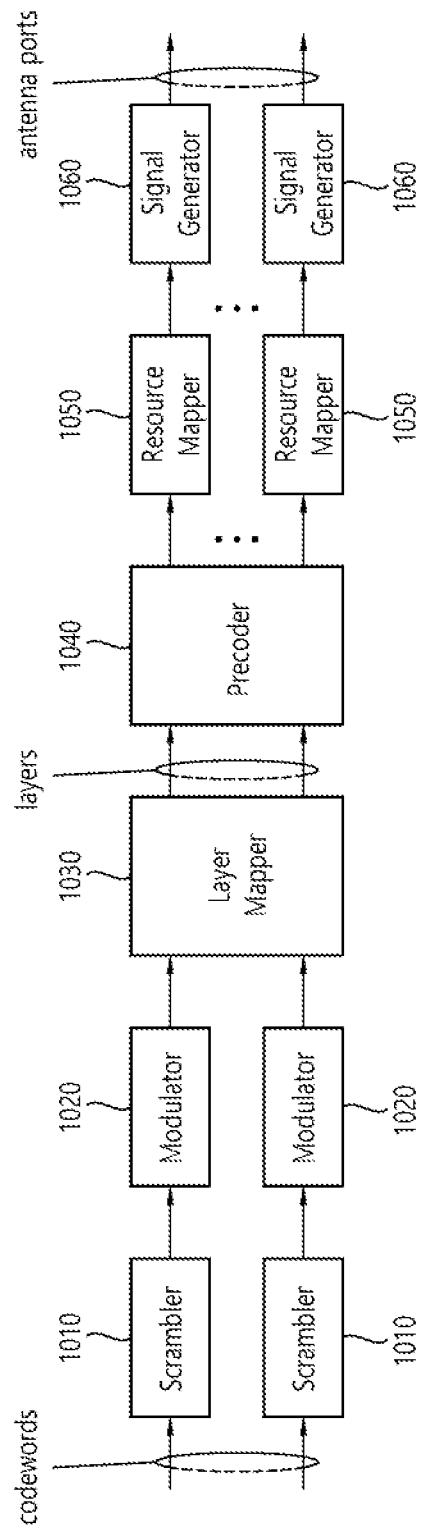
FIG. 15 shows a signal process circuit for a transmission signal, based on an embodiment of the present disclosure.

FIG. 15 shows a signal process circuit for a transmission signal, based on an embodiment of the present disclosure. The embodiment of FIG. 15 may be combined with various embodiments of the present disclosure.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 16:
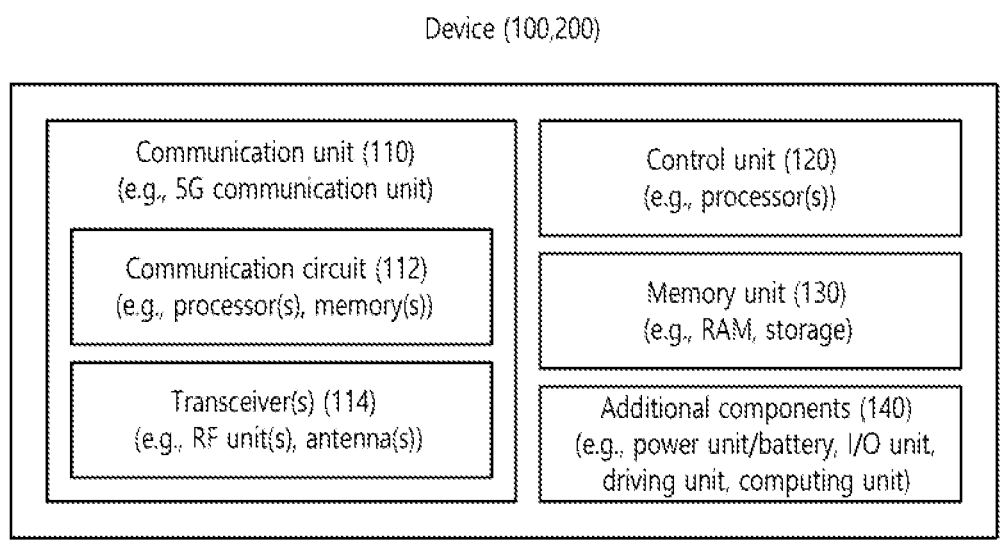
FIG. 16 shows another example of a wireless device, based on an embodiment of the present disclosure.

FIG. 16 shows another example of a wireless device, based on an embodiment of the present disclosure. The wireless device may be implemented in various forms according to a use-case/service (refer to FIG. 13). The embodiment of FIG. 16 may be combined with various embodiments of the present disclosure.

Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 13), the vehicles (100*b*-1 and 100*b*-2 of FIG. 13), the XR device (100*c* of FIG. 13), the hand-held device (100*d* of FIG. 13), the home appliance (100*e* of FIG. 13), the IoT device (100*f* of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 16 will be described in detail with reference to the drawings.

Figure 17:
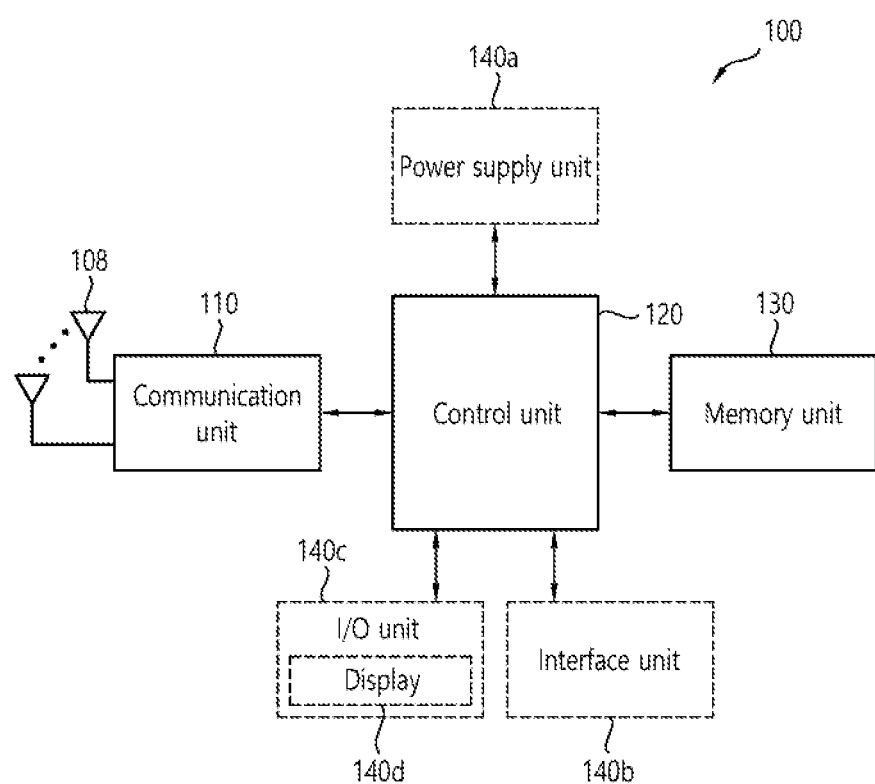
FIG. 17 shows a hand-held device, based on an embodiment of the present disclosure.

FIG. 17 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 17 may be combined with various embodiments of the present disclosure.

Referring to FIG. 17, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 18:
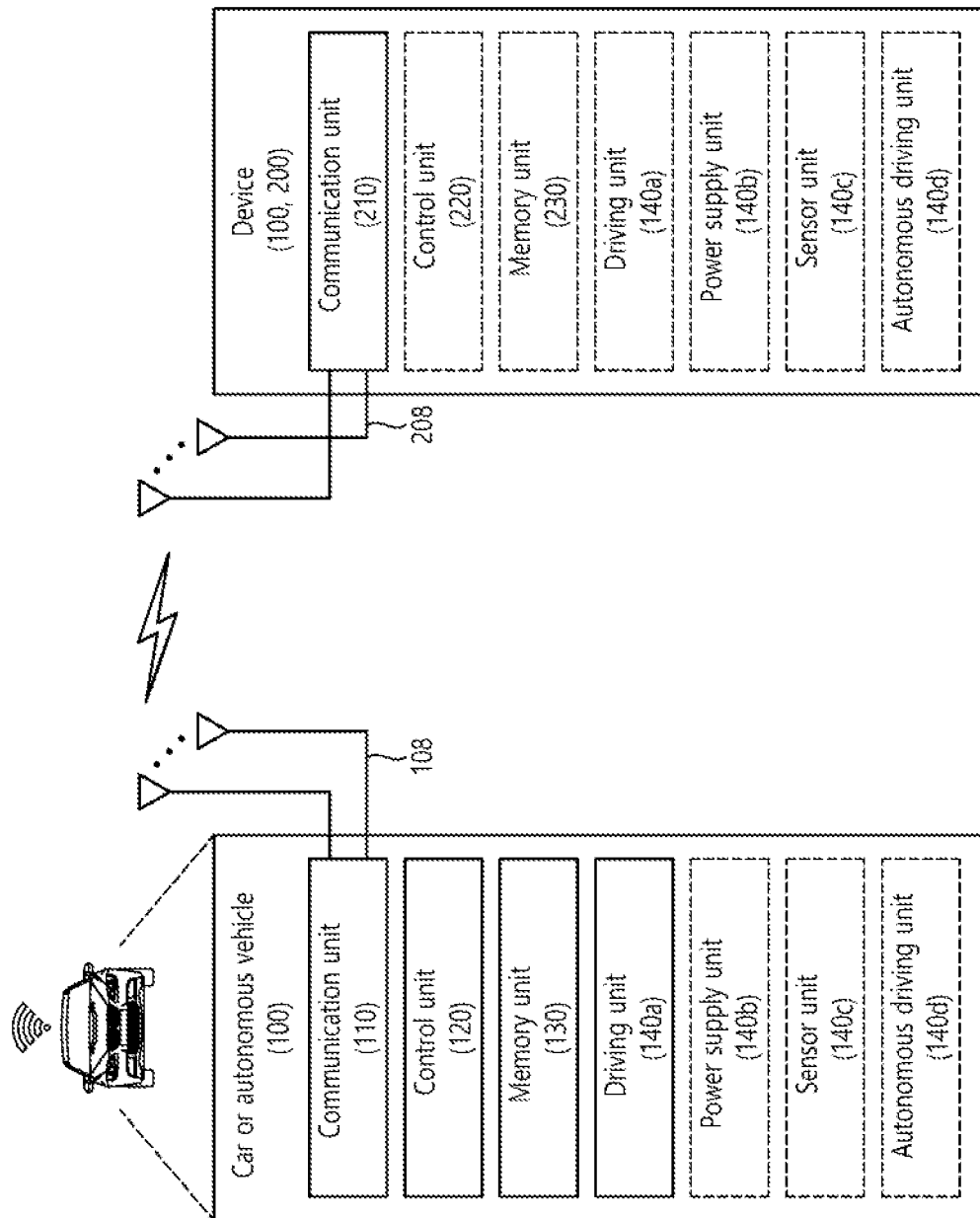
FIG. 18 shows a vehicle or an autonomous vehicle, based on an embodiment of the present disclosure.

FIG. 18 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 18 may be combined with various embodiments of the present disclosure.

Referring to FIG. 18, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
    obtaining a sidelink (SL) discontinuous reception (DRX) configuration including an SL DRX hybrid automatic repeat request (HARQ) round trip time (RTT) timer value for HARQ disabled sidelink transmission;
    receiving SCI for scheduling of a physical sidelink shared channel (PSSCH); and
    starting an SL DRX HARQ RTT timer, based on a physical sidelink feedback channel (PSFCH) resource being configured to an SL grant related to the SCI and a HARQ feedback being disabled,
    wherein the SL DRX HARQ RTT timer is started in a slot following an end of a transmission through the PSSCH, based on resources for one or more retransmission opportunities being scheduled in the SCI, and wherein the SL DRX HARQ RTT timer is started in a slot following an end of the PSFCH resource and runs as long as the SL DRX HARQ RTT timer value, based on resources for one or more retransmission opportunities being not scheduled in the SCI.

2. The method of claim 1, further comprising:
receiving a retransmission of a MAC PDU of the PSSCH, based on the SL HARQ RTT timer being expired and the resources for the one or more retransmission opportunities.

3. The method of claim 2, wherein the step of receiving the retransmission of the MAC PDU includes:
starting an SL HARQ retransmission timer, based on the SL HARQ RTT timer being expired; and
receiving the retransmission of the MAC PDU, based on the SL HARQ retransmission timer being running and the resources for the one or more retransmission opportunities.

4. The method of claim 1, further comprising:
transmitting HARQ NACK information related to a MAC PDU of the PSSCH to a second device, based on an active time.

5. The method of claim 1, wherein the first device doesn't perform a monitoring for a PSCCH of a PSSCH, based on the SL HARQ RTT timer being running.

6. The method of claim 5, wherein the PSCCH or the PSSCH, for which the monitoring is not performed based on the SL HARQ RTT timer being running, is related to an SL HARQ process related to a MAC PDU of the PSSCH.

7. The method of claim 1, wherein the SL DRX HARQ RTT timer runs from the next slot of the end of the transmission through the PSSCH until before a time point of the resources the one or more retransmission opportunities, based on the resources for one or more retransmission opportunities being scheduled.

8. The method of claim 1, further comprising:
determining that the resources for the one or more retransmission opportunities of a MAC PDU of the PSSCH exist after 32 slots from the SCI, based on resources for one or more retransmission opportunities being not scheduled in the SCI.

9. The method of claim 7, wherein the first device operates in a sleep mode from a time of transmission of the SCI to a time of the PSFCH resource, based on a MAC PDU of the PSSCH being a HARQ enabled MAC PDU.

10. The method of claim 1, wherein an active timer including the SL DRX HARQ RTT timer includes an SL DRX on-duration timer and an SL DRX inactivity timer.

11. The method of claim 10, wherein an active time related to the SL DRX HARQ RTT timer is a time during which the active timer is running.

12. The method of claim 1, wherein the SL DRX configuration is obtained through a PC5 RRC message.

13. A first device for performing wireless communication, the first device comprising:
one or more memories storing instructions;
one or more transceivers; and
one or more processors connected to the one or more memories and the one or more transceivers, wherein the one or more processors execute the instructions to:
obtain a sidelink (SL) discontinuous reception (DRX) configuration including an SL DRX hybrid automatic repeat request (HARQ) round trip time (RTT) timer value for HARQ disabled sidelink transmission;
receive SCI for scheduling of a physical sidelink shared channel (PSSCH); and
start an SL DRX HARQ RTT timer, based on a physical sidelink feedback channel (PSFCH) resource being configured to an SL grant related to the SCI and a HARQ feedback being disabled,
wherein the SL DRX HARQ RTT timer is started in a slot following an end of a transmission through the PSSCH, based on resources for one or more retransmission opportunities being scheduled in the SCI, and
wherein the SL DRX HARQ RTT timer is started in a slot following an end of the PSFCH resource and runs as long as the SL DRX HARQ RTT timer value, based on resources for one or more retransmission opportunities being not scheduled in the SCI.

14. The first device of claim 1, the first device not performing a monitoring for a PSCCH of a PSSCH, based on the SL HARQ RTT timer being running.

15. A device configured to control a first user equipment (UE), the device comprising:
one or more processors; and
one or more memories operably connectable to the one or more processors and storing instructions, wherein the one or more processors execute the instructions to:
obtain a sidelink (SL) discontinuous reception (DRX) configuration including an SL DRX hybrid automatic repeat request (HARQ) round trip time (RTT) timer value for HARQ disabled sidelink transmission;
receive SCI for scheduling of a physical sidelink shared channel (PSSCH); and
start an SL DRX HARQ RTT timer, based on a physical sidelink feedback channel (PSFCH) resource being configured to an SL grant related to the SCI and a HARQ feedback being disabled,
wherein the SL DRX HARQ RTT timer is started in a slot following an end of a transmission through the PSSCH, based on resources for one or more retransmission opportunities being scheduled in the SCI, and
wherein the SL DRX HARQ RTT timer is started in a slot following an end of the PSFCH resource and runs as long as the SL DRX HARQ RTT timer value, based on resources for one or more retransmission opportunities being not scheduled in the SCI.

* * * * *